(12) United States Patent
Shimada et al.

(10) Patent No.: US 9,595,841 B2
(45) Date of Patent: Mar. 14, 2017

(54) DC-DC CONVERTER, SECONDARY BATTERY CHARGE AND DISCHARGE SYSTEM, AND METHOD OF CONTROLLING DC-DC CONVERTER

(71) Applicant: Hitachi Information & Telecommunication Engineering, Ltd., Yokohama-shi, Kanagawa (JP)

(72) Inventors: Takae Shimada, Tokyo (JP); Hiroyuki Shoji, Tokyo (JP); Kimiaki Taniguchi, Yokohama (JP); Kuniyoshi Watanabe, Yokohama (JP)

(73) Assignee: Hitachi Information & Telecommunication Engineering, Ltd., Kanagawa (JP)

(*) Notice: Subject to any disclaimer, the term of this patent is extended or adjusted under 35 U.S.C. 154(b) by 126 days.

(21) Appl. No.: 14/603,820

(22) Filed: Jan. 23, 2015

(65) Prior Publication Data
US 2015/0214847 A1 Jul. 30, 2015

(30) Foreign Application Priority Data

Jan. 24, 2014 (JP) ................. 2014-011776

(51) Int. Cl.
 *H02J 7/00* (2006.01)
 *H02M 1/32* (2007.01)
 (Continued)

(52) U.S. Cl.
 CPC .............. *H02J 7/0052* (2013.01); *H02M 1/32* (2013.01); *H02M 3/33584* (2013.01);
 (Continued)

(58) Field of Classification Search
 CPC ... Y02T 90/127; Y02T 90/14; Y02T 10/7005; Y02T 90/121; Y02T 10/7241; Y02T 10/7055; Y02T 10/7216
 (Continued)

(56) References Cited

U.S. PATENT DOCUMENTS

| 2010/0295502 A1* | 11/2010 | Mevay ................. H02M 3/156 320/101 |
| 2011/0101915 A1* | 5/2011 | Mitsutani .............. B60K 6/445 320/109 |

(Continued)

FOREIGN PATENT DOCUMENTS

| CN | 103124138 | 5/2013 |
| CN | 103532390 A | 1/2014 |

(Continued)

OTHER PUBLICATIONS

Wang et al.; "Bi-directional DC to DC Converters for Fuel Cell Systems"; IEEE power electronics in transportation, IEEE, 1998, pp. 47-51.
(Continued)

*Primary Examiner* — Binh Tat
(74) *Attorney, Agent, or Firm* — Mattingly & Malur, PC

(57) ABSTRACT

In a DC-DC converter, a smoothing capacitor is connected between DC terminals of the switching circuit, and a smoothing capacitor and a voltage clamp circuit are connected between DC terminals of a switching circuit, the voltage clamp circuit including the switching device and the clamp capacitor. The smoothing capacitors are connected to the DC power sources) in parallel, respectively. The winding of the switching circuit is magnetically coupled to the winding of the switching circuit by the transformer. The DC-DC converter performs a discharging operation for discharging the clamp capacitor between at least one of the
(Continued)

step-down operation and a step-up operation and a step-up operation performed thereafter.

17 Claims, 14 Drawing Sheets

(51) Int. Cl.
 *H02M 3/335* (2006.01)
 *H02M 1/00* (2006.01)
(52) U.S. Cl.
 CPC ........... *H02M 2001/0058* (2013.01); *H02M 2001/322* (2013.01); *Y02B 70/1491* (2013.01)
(58) Field of Classification Search
 USPC .................................................. 320/107–115
 See application file for complete search history.

(56) References Cited

U.S. PATENT DOCUMENTS

| 2011/0181238 | A1* | 7/2011 | Soar | B60N 2/24 |
| | | | | 320/108 |
| 2014/0009972 | A1 | 1/2014 | Chiang et al. | |

FOREIGN PATENT DOCUMENTS

| EP | 1 677 410 A1 | 7/2006 |
| EP | 2 393 195 A2 | 12/2011 |
| JP | 2002-165448 A | 6/2002 |
| JP | 2008-79403 A | 4/2008 |
| JP | 2009-55747 A | 3/2009 |

OTHER PUBLICATIONS

Chinese Office Action received in corresponding Chinese Application No. 201510035347.4 dated Nov. 2, 2016.
Jang, S. et al., "Bi-directional DC-DC Converter for Fuel Cell Generation System", 35th Annual IEEE Power Electronics Specialists Conference, 2004, pp. 4722-4728, Germany.
Shimada, T. et al., "Two Novel Control Methods Expanding Input-output Operating Range for a Bi-directional Isolated DC-DC Converter with Active Clamp Circuit", IEEE on Energy Conversion Congress and Exposition, 2012, pp. 2537-2543.

* cited by examiner

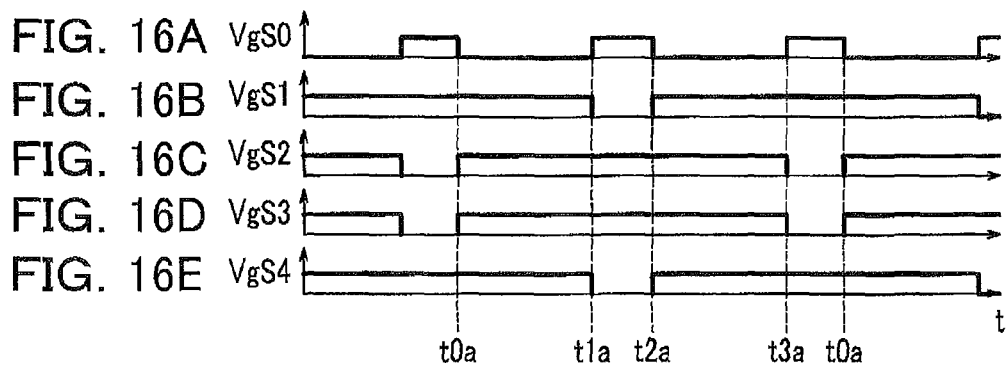
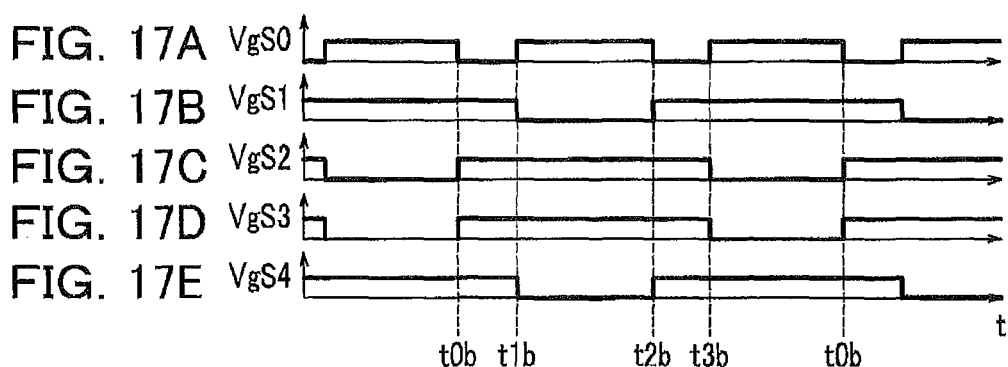
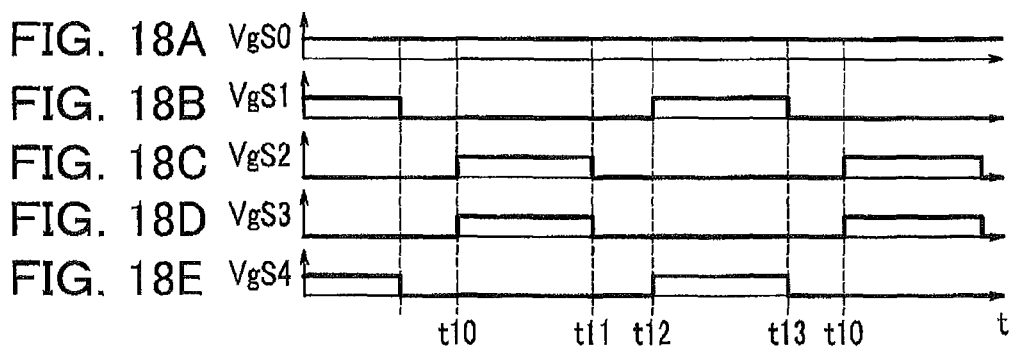

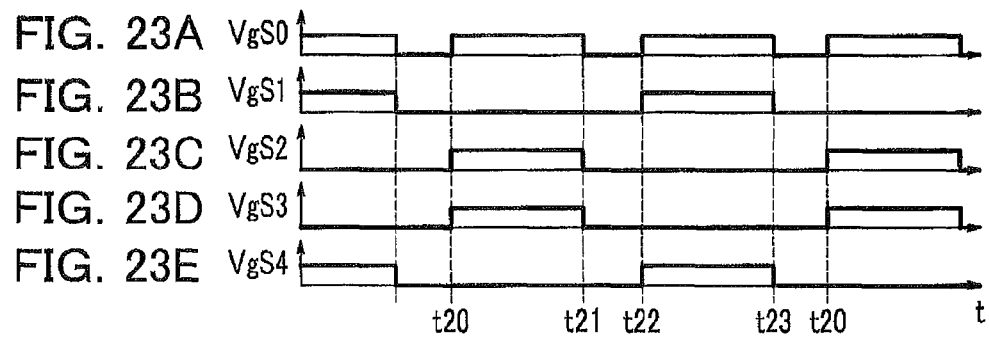
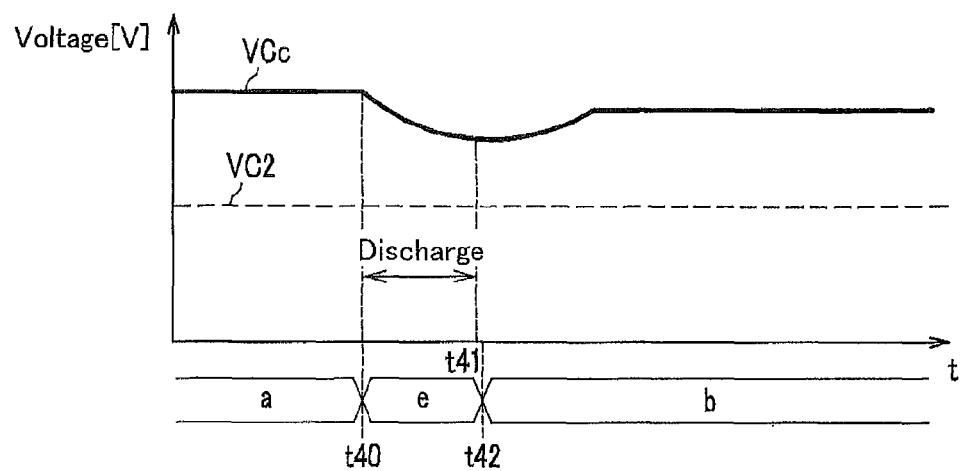
FIG. 24

DC-DC CONVERTER, SECONDARY
BATTERY CHARGE AND DISCHARGE
SYSTEM, AND METHOD OF CONTROLLING
DC-DC CONVERTER

CROSS REFERENCE TO RELATED APPLICATION

This application claims the foreign priority benefit under Title 35, United States Code, §119(a)-(d) of Japanese Patent Application No. 2014-011776, filed on Jan. 24, 2014 in the Japan Patent Office, the disclosure of which is herein incorporated by reference in its entirety.

BACKGROUND OF THE INVENTION

1. Field of the Invention

The present invention relates to a DC-DC Converter for supplying a power of a DC power source to a DC load or a DC power source, and a secondary battery charge and discharge system including the same, and a method of controlling the DC-DC Converter.

2. Description of the Related Art

Recently, systems including a DC power source such as a secondary battery, a solar cell, a fuel cell, etc. have been developed due to increase demands for global environment conservation. These systems require a DC-DC converter for supplying a power from a DC power source to a load, or another DC power source.

An abstract of JP2008-79403 A discloses "semiconductor switching devices Q1 to Q4 are disposed between a DC power source and a transformer, and a rectifying circuit and an output smoothing circuit are disposed between the transformer and the load. JP2008-79403 A discloses as follows:

An RCD snubber circuit is disposed between a rectifying circuit and an output smothering circuit to absorb a serge voltage included in an output side voltage V1 of the rectifying circuit through a snubber diode Ds. The charges in the snubber capacitor are discharged through a snubber resistor and supplied to a load as an electric power.

However, because supplying the charges stored in the snubber capacitor for clamping the surge voltage to the load as an electric power is done through the snubber resistor, the snubber resistor consumes the energy.

On the other hand, JP 2009-55747 A discloses a bi-directional DC-DC converter including a transformer for connecting a voltage type full bridge circuit connected to a first power source and a current type switching circuit connected to a second voltage source. Further, a voltage clamp circuit including switching devices and clamping capacitor is connected to the current type switching circuit and there is provided with a control circuit for cooperatively operating the switching devices so as to control a current flowing through a resonation reactor. Non-patent document K. Wang, C. Y. Lin, L. Zhu, D. Qu, F. C. Lee and J. S. Lai, "Bi-directional DC to DC Converters for Fuel Cell Systems", IEEE power electronics in transportation, IEEE, 1998, pp. 47-51 discloses a configuration similar to JP 2009-55747 A.

These DC-DC converters perform a step-down operation (bucking operation) for supplying power from the voltage type circuit to the current type circuit and a step-up operation (boosting operation) for supplying a power from the current type circuit to the voltage type circuit. These DC-DC converters discharge not through the snubber resistor, but through clamp switching devices in ON states when the charges in the clamp capacitors are discharged, so that an energy loss by the snubber resistor can be avoided previously.

Hereinafter the step-down operation throughout the specification means supplying a power from the voltage type circuit to the current type circuit. The boosting operation means supplying the power from the current type circuit to the voltage type circuit.

In the DC-DC converters, generally, the operation is started from a status in which an output is restricted to prevent an excessive current from flowing through the circuit when the power conversion operation starts and after that the output is gradually increased. In the DC-DC converters disclosed in JP2008-79403A and JP2009-55747A, when the step-up operation (boosting operation) is started in the status in which the output is restricted, a duty ratio of the switching devices in the current type circuit is low and a duty ratio of the clamp switching circuit is higher.

However, in these DC-DC converters, the clamp capacitor is charged in step-down operation at a voltage higher than the output voltage during the operation. Further, the clamp capacitor is charged at a voltage higher than an input voltage during the step-up operation. The clamp capacitor holds the voltage for a predetermined period after the step-down and step-up operations. Accordingly, there may be a case where the step-up operation is started when the step-up operation is started in a state that the clamp capacitor is charged at a high voltage, an excessive current may flow through the clamp switching device or a smoothing inductor because of the high ratio of an ON period of the clamp switching device.

To suppress the excessive current, there is a method of controlling a current in which the charges in the clamp capacitor are gradually discharged through a resistive component and after the voltage drop of the clamp capacitor the step-up operation is started. In this method, there is a problem in that a predetermined period is required up to start of a next step-up operation after the stop of the step-down and step-up operation.

To suppress the excessive current, it may be possible to add a circuit for discharging for the clamp capacitor separately. This will increase a cost.

SUMMARY OF THE INVENTION

An aspect of the present invention provides a DC-DC converter having a short time interval necessary to start the step-up operation at a low cast and a secondary battery charge and discharge system using the same and a control method of the DC-DC converter.

An aspect of the present invention provides a DC-DC converter comprising:

a first switching circuit in which a first smoothing capacitor is connected between DC terminals, and a primary winding is connected between AC terminals;

a second switching circuit in which a smoothing inductor and a second smoothing capacitor which are connected in series and connected between DC terminals, and a secondary winging is connected to AC terminals;

a transformer providing magnetic coupling between the primary winding to the secondary winding;

a voltage clamp circuit, including a clamp capacitor and a clamp switching device which are connected in series, the voltage clamp circuit being connected between DC terminals of the second switching circuit or between the AC terminals of the second switching circuit and one end of the second smoothing capacitor;

a controller operating either of a first mode or a second operation mode, wherein in the first mode, a power inputted between the first terminals, which are both terminals of the first smoothing capacitor, is outputted between the second terminals, which are both terminals of the second smoothing capacitor, in the second mode a power inputted between the second terminals is outputted between the first terminals, wherein in a third mode, the controller outputs, between the first terminals and/or the second terminals, a power discharged from the clamp capacitor by switching the clamp switching device, the third mode being performed between an interruption after the first mode or after the second mode and the second mode performed subsequent to the interruptions.

An aspect of the present invention provides a secondary battery charge and discharge system including the DC-DC converter.

An aspect of the present invention provides a method of controlling a DC-DC converter including:

a first switching circuit in which a first smoothing capacitor is connected between DC terminals, and a primary winding is connected between AC terminals;

a second switching circuit in which a smoothing inductor and a second smoothing capacitor which are connected in series and connected between DC terminals, and a secondary winging is connected to AC terminals;

a transformer providing magnetic coupling between the primary winding to the secondary winding;

a voltage clamp circuit, including a clamp capacitor and a clamp switching device which are connected in series, the voltage clamp circuit being connected between DC terminals of the second switching circuit or between the AC terminals of the second switching circuit and one end of the second smoothing capacitor;

a controller controlling the first and second switching circuits, the method comprising:

a step providing interruption after control in either of a first operation mode to output a power inputted to the first terminals, which are both ends of the first smoothing capacitor at second terminals, which are both ends of the second smoothing capacitor or a second operation mode to output a power inputted between the second terminals at the first terminals, a step provides control in a third operation mode to output a power discharged from the clamp capacitor by switching the clamp switching device at least one of the first terminals and the second terminals, and a step starting control in the second operation mode after the third operation mode.

An aspect of the present invention is to provide a DC-DC converter having a short time interval to start a boosting operation at a low cost and a secondary battery discharging system using the same and a method of controlling operation of the DC-DC converter.

BRIEF DESCRIPTION OF DRAWINGS

FIGS. 16A to 16E are timing charts illustrating a switching operation (1) out of the step-up operations of the DC-DC converter according to the first embodiment.

FIGS. 17A to 17E are timing charts illustrating a switching operation (2) out of the step-up operations of the DC-DC converter according to the first embodiment.

FIGS. 18A to 18E are timing charts illustrating a switching operation (3) out of the step-up operations of the DC-DC converter according to the first embodiment.

FIGS. 23A to 23E are timing charts illustrating a switching operation out of the step-up operations of the DC-DC converter according to a modification.

FIG. 24 is an illustration indicating switchover from the step-down operation of the DC-DC converter in the first embodiment to a step-up operation according to a modification.

MODES FOR CARRYING OUT INVENTION

With reference to drawings embodiments according to the invention are described in detail.

First Embodiment

Figure 1:
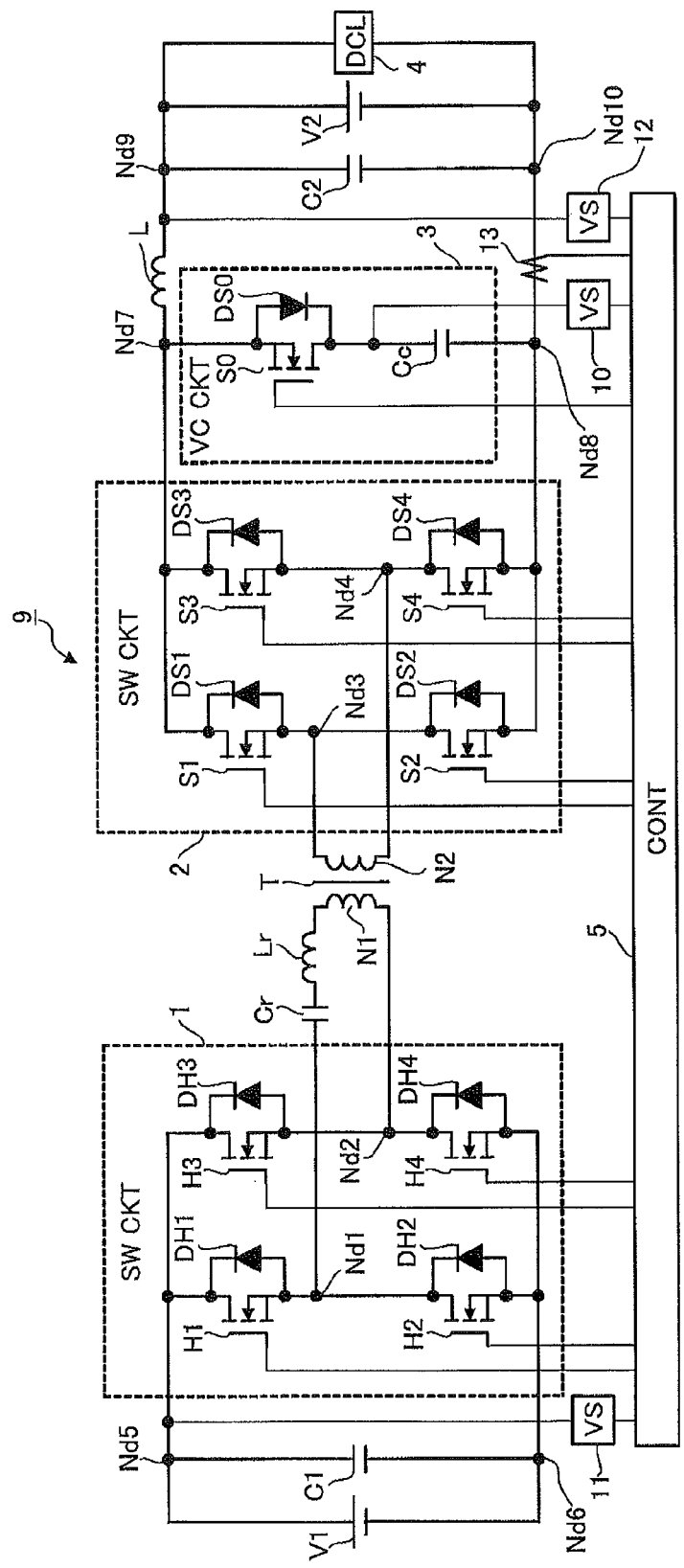
FIG. 1 is a circuit diagram of a DC-DC converter according to a first embodiment.

FIG. 1 is a circuit diagram of a DC-DC converting system 109 including a DC-DC converter 9 according to a first embodiment of the present invention.

As shown in FIG. 1, a DC-DC converter 9 includes switching circuits 1, 2, a voltage clamp circuit 3, and a controller 5 for controlling ON-OFF states of respective switching devices included in these circuits. The DC-DC converter 9 is connected between a DC power source V1 (first DC power source) and a DC power source V2 (second DC power source) connected to a DC load 4. The DC-DC converter 9 is a device for supplying a power from the DC power source V1 to the DC load 4 or the DC power source V2 and a power from the DC power source V2 to the DC power source V1.

Connected between nodes Nd5, Nd6 which are DC terminals of the switching circuit 1 is a smoothing capacitor C1 (first smoothing capacitor).

Connected between nodes Nd1, Nd2, which are AC terminals of the switching circuit 1 (first switching circuit), are a resonating capacitor Cr, a resonating inductor Lr, and a winding N1 (primary winding) in series. The resonating capacitor Cr removes DC components flowing through the winding N1 to reduce bias magnetism in a transformer T.

Connected between nodes Nd7, Nd8, i.e., between the DC terminals of a switching circuit 2, are a smoothing inductor L, and a smoothing capacitor C2 (second smoothing capacitor) which are connected in series. Connected between nodes Nd3, Nd4, i.e., between AC terminals of the switching circuit 2, is a winding N2 (secondary winding).

The transformer T magnetically couples the winding N1 with the winding N2.

Both terminals (first terminals) of the smoothing capacitor C1 connected to the switching circuit 1 are the nodes Nd5, Nd6. Both terminals (second terminals) of the smoothing capacitor C2 (second smoothing capacitor) connected to the switching circuit 2 are nodes Nd9, Nd10. The nodes Nd5, Nd6, and the nodes Nd9, Nd10 are input-output terminals of the DC-DC converter 9. The DC power source V1 is connected between the nodes Nd5, Nd6 in parallel. The DC power source V2 is connected between the nodes Nd9, Nd10 in parallel.

The switching circuit 2 (second switching circuit) is configured including switching devices S1 to S4 connected in a full bridge connection. In other words, the switching device S1 (first switching device) and a switching device S2 (second switching device) are connected in series at the node Nd3 to form a first switching leg. The switching device S3 (third switching device) and a switching device S4 (fourth switching device) are connected in series at the node Nd4 to form a second switching leg. The switching circuit 2 includes the first and second switching legs connected in parallel to have DC terminals at the nodes Nd7 Nd8 which are both terminals of the first switching leg and AC terminals at the nodes Nd3, Nd4.

The switching circuit 1 is configured including switching devices H1 to H4 connected in a full bridge circuit similar to the switching circuit 2. More specifically, the switching device H1 (fifth switching device) and a switching device H2 (sixth switching device) are connected in series through the node Nd1 to form a third switching leg. A switching device H3 (seventh switching device) and a switching device H4 (eighth switching device) are connected in series through the node Nd2 to form a fourth switching leg. The switching circuit 1 is formed by connecting the third switching leg and the fourth switching leg in parallel and has DC terminals at the nodes Nd5, Nd6, which are both terminals of the third switching leg, and AC terminals at the nodes Nd1, Nd2.

The voltage clamp circuit 3 includes a switching device S0 (clamp switching device) and a clamp capacitor Cc connected in series. The voltage clamp circuit 3 in the first embodiment is connected between the DC terminals of the switching circuit 2. Accordingly, the voltage clamp circuit 3 can suppress the surge voltage applied between the DC terminals.

The switching devices H1 to H4 and S0 to S4 are connected to diodes DH1 to DH4 and DS0 to DS4 in anti-parallel connections, respectively. When MOSFETs (metal-oxide-semiconductor field-effect transistors) are used for the switching devices H1 to H4, and S0 to S4, parasitic diodes of the MOSFETs can be used. Accordingly, the diodes DH1 to DH4, DS0 to DS4 can be omitted.

The smoothing capacitor C1 and the switching devices H1 to H4 form a voltage type full bridge circuit. The smoothing inductor L and the switching devices S1 to S4 form a current type full bridge circuit. The DC-DC converter 9 in the first embodiment is configured including the voltage type full bridge circuit and the current type full bridge circuit which are coupled by a transformer T. The current type full bridge circuit is further connected to a voltage clamp circuit 3 configured including the switching device S0 and the clamp capacitor Cc.

Connected to the clamp capacitor Cc is a voltage sensor 10 for detecting a voltage of the clamp capacitor Cc. Connected to the smoothing capacitor C1 is a voltage sensor 11 for detecting a DC input-output voltage of the voltage type full bridge circuit. Further, a voltage sensor 12 is connected to the smoothing capacitor C2 for detecting a DC input-output voltage of the current type full bridge circuit. A current sensor 13 detects a current flowing through the smoothing inductor L. Output sides of these voltage sensors 10, 11, and 12, and an output side of the current sensor 13 are connected to the controller 5.

The controller 5 is connected to gates of the switching devices H1 to H4 and S0 to S4 to control the switching devices H1 to H4 and S0 to S4.

The controller 5 has controlling in either a step-down operation mode (first operation mode) in which the power inputted between the nodes Nd5, Nd6 (between first terminals) is outputted between the nodes Nd9, Nd10 (between the second terminals) or a step-up operation mode (second operation mode) in which the power inputted between the nodes Nd9, Nd10 is outputted between the nodes Nd5, Nd6. The step-down operation mode is described later in detail with reference to FIGS. 2 to 7. The step-up operation mode is described in detail later with reference to FIGS. 8 to 15.

After an interruption of the step-down operation mode or an interruption of the step-up operation mode, the controller 5 performs control in a discharging mode (third operation mode) in which the power discharged from the clamp capacitor Cc by switching the clamp switching device S0 is outputted between the nodes Nd5, Nd6 and/or between the nodes Nd9, Nd10 and then. After this, the controller 5 performs control in the step-up operation mode. The discharging mode is described later in detail with reference to FIGS. 19 to 21.

The step-down operation is described with reference to FIGS. 2 to 7 in which the DC-DC converter 9 shown in FIG. 1 supplies the power from the DC power source V1 to the DC power source V2. FIGS. 2 to 7 indicate the circuit operation of the DC-DC converter 9 in modes a1 to a6, respectively. FIGS. 2 to 7 indicate only main parts of the circuit of the DC-DC converter 9 and further indicate current flows with arrows having broken lines.

In the specification, a voltage between both terminals of a switching device in an ON state and a voltage equivalent to or smaller than a forward voltage drop of a diode is referred to as "zero voltage". Further, turning on of a switching device when a voltage between both terminals of the switching device is the zero voltage is referred to as "zero voltage switching". The zero volt switching provides an advantageous effect in suppression of the switching loss.

Figure 2:
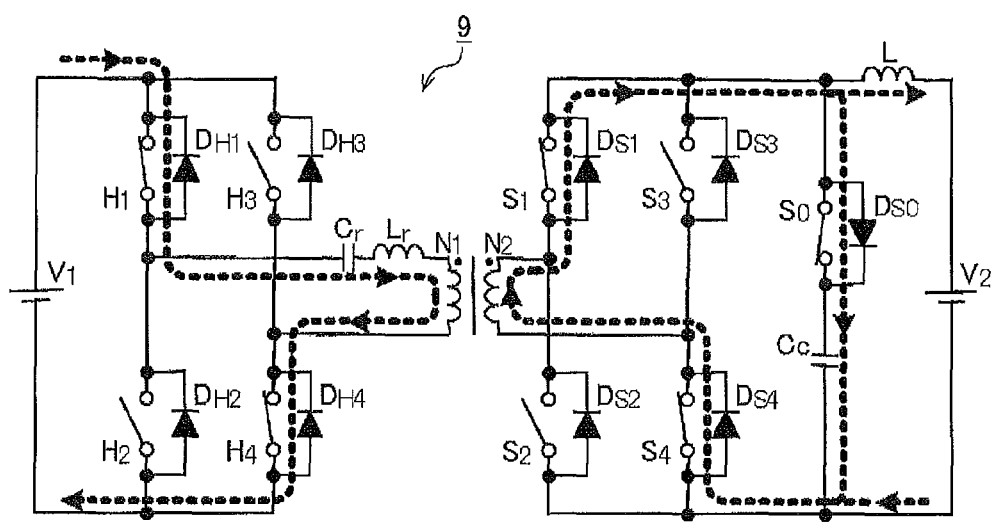
FIG. 2 is an illustration indicating a mode a1 of the step-down operation of the DC-DC converter according to the first embodiment.

FIG. 2 shows the mode a1 in the step-down operation of the DC-DC converter 9 in the first embodiment.

As shown in FIG. 2, in the mode a1, the switching devices H1, H4 are in the ON states, and the switching devices H2, H3 are in OFF states, so that the voltage of the DC power source V1 is applied to the winding N1 through the switching devices H1, H4, the resonating capacitor Cr, and the resonating inductor Lr. The switching devices S2, S3 are in the OFF states, and the voltage generated in the winding N2 is applied to the smoothing inductor L and the DC power source V2 through diodes DS1 and DS4, so that a current in the smoothing inductor L is supplied to the DC power source V2.

In this state, when MOSFETs are used as the switching devices S1 to S4, there may be a case where a loss can be reduced by shunting the current flowing through the diodes DS1 and DS4 to the switching devices S1 and S4 by making the switching devices S1 and S4 in ON states. As described, the reduction of the loss by turning on the MOSFETs when a forward current flows through the diode connected to the MOSFET in the anti-parallel connection or parasitic diodes of the MOSFETs, is referred to as "synchronous rectification".

Further, a voltage generated in the winding N2 charges the clamp capacitor Cc through a diode DS0, DS1, DS4. At this instance, the controller 5 turns on the switching device S0 (zero voltage switching).

Figure 3:
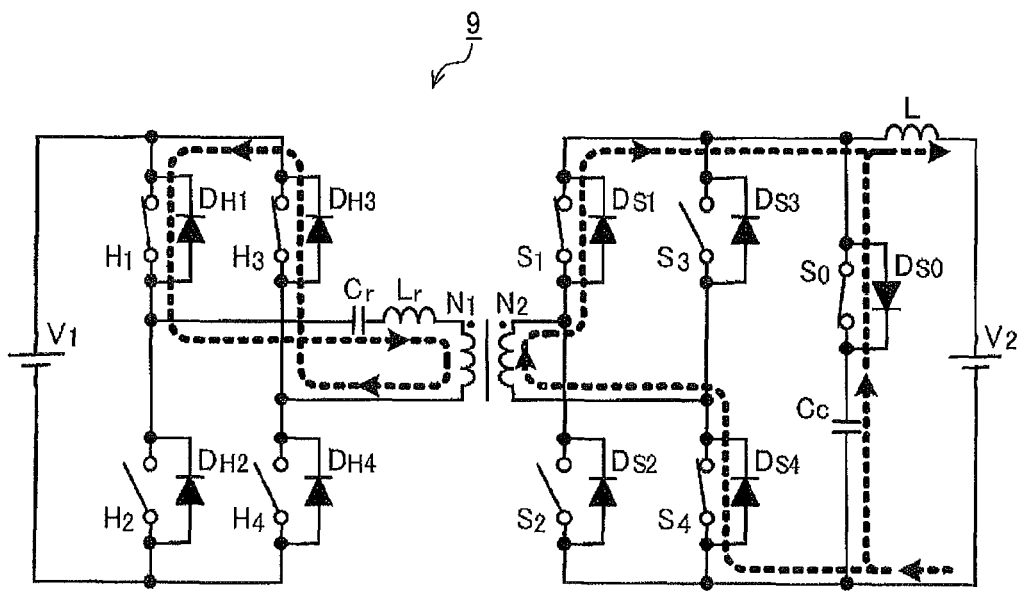
FIG. 3 is an illustration indicating a mode a2 of the step-down operation of the DC-DC converter according to the first embodiment.

FIG. 3 shows a mode a2 in the step-down operation of the DC-DC converter 9 in the first embodiment.

In a mode a1 (see FIG. 2), when the controller 5 turns off the switching device H4, the current that has flowed through the switching device H4 is commutated (change a path of current) to a diode DH3, so that the mode becomes the mode a2 shown in FIG. 3. At this instance, the controller 5 turns on the switching device H3 (zero voltage switching). The current flowing through the resonating inductor Lr is a circulating current circulating a path via the winding N1, the diode DH3, the switching device H1, and the resonating capacitor Cr.

The switching device S0 keeps the ON state, and the voltage at the clamp capacitor Cc is applied to the winding N2 through the diodes DS1, DS4. The voltage generated at the N1 is applied to the resonating inductor Lr through the diode DH3, the switching device H1, and the resonating capacitor Cr, and the circulating current decreases. At this instance, the discharge current of the clamp capacitor Cc is supplied to the output through the switching device S0 and the smoothing inductor L.

Figure 4:
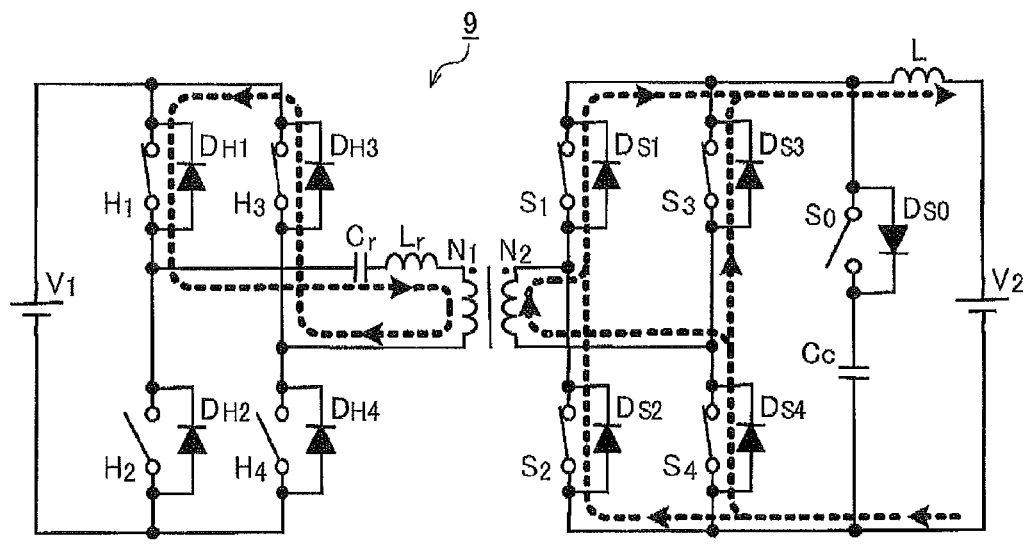
FIG. 4 is an illustration indicating a mode a3 of the step-down operation of the DC-DC converter according to the first embodiment.

FIG. 4 shows a mode a3 in the step-down operation of the DC-DC converter 9 in the first embodiment.

In the mode a2 (see FIG. 3), when the controller 5 turns off the switching device S0, the discharging of the clamp capacitor Cc finishes, and the status becomes in a mode a3 shown in FIG. 4. The current flowing through the switching device S0 is commutated to the diodes DS1 to DS4, and the current flowing through the smoothing inductor L flows through the diodes DS1 to DS4 in a branched flow state. At this instance, when the controller 5 turns on the switching devices S2, S3, the synchronous rectification is performed. The current flowing through the smoothing inductor L flows through the winding N2 and the diodes DS1 to DS4 and is supplied to the DC power source V2.

In the mode a3, the winding N2 becomes no application of voltage, so that no voltage is generated at the winding N1. Accordingly, the resonating inductor Lr becomes no application of the voltage thereto, so that the decrease in the circulating current finishes, and the circulating current decreased in the mode a2 is kept.

Figure 5:
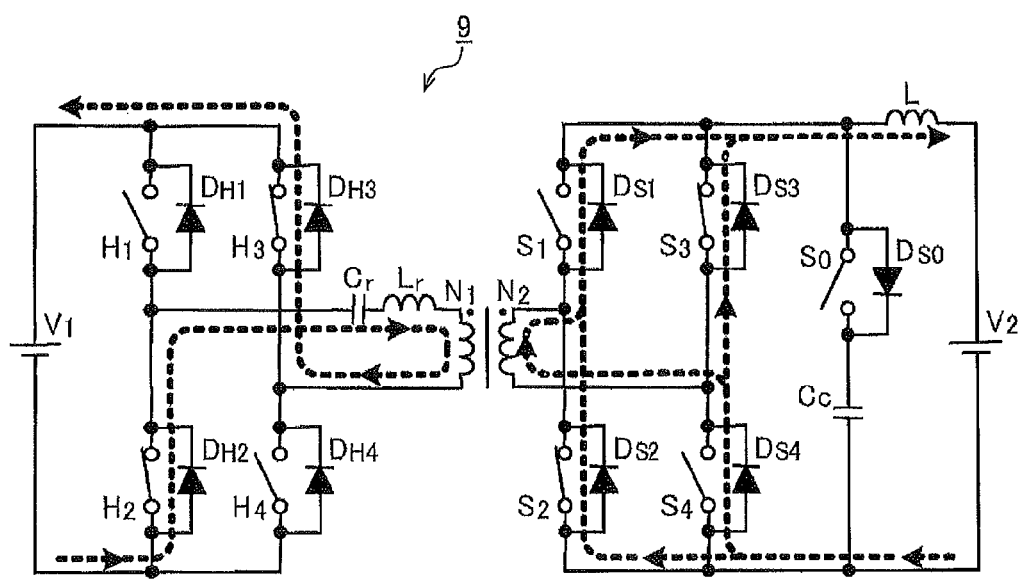
FIG. 5 is an illustration indicating a mode a4 of the step-down operation of the DC-DC converter according to the first embodiment.

FIG. 5 shows a mode a4 in the step-down operation of the DC-DC converter 9 in the first embodiment.

In the mode a3 (see FIG. 4), when the controller 5 turns off the switching device H1, the current which has been flowing through the switching device H1 is commutated to the diode DH2 through the DC power source V1, and the state becomes the mode a4 shown in FIG. 5. At this instance, the controller 5 turns on the switching device H2 (zero voltage switching). The current flowing through the resonating inductor Lr flows into the DC power source V1 through a path of the winding N1 and the diode DH3 and returns from the DC power source V1 via a path of the diode DH2 and the resonating capacitor Cr to the resonating inductor Lr. The voltage of the DC power source V1 is applied to the resonating inductor Lr, and the current in the resonating inductor Lr is decreasing. The switching devices S1, S4, which are turned on for the synchronous rectification, are turned off until finish of a mode a5.

Figure 6:
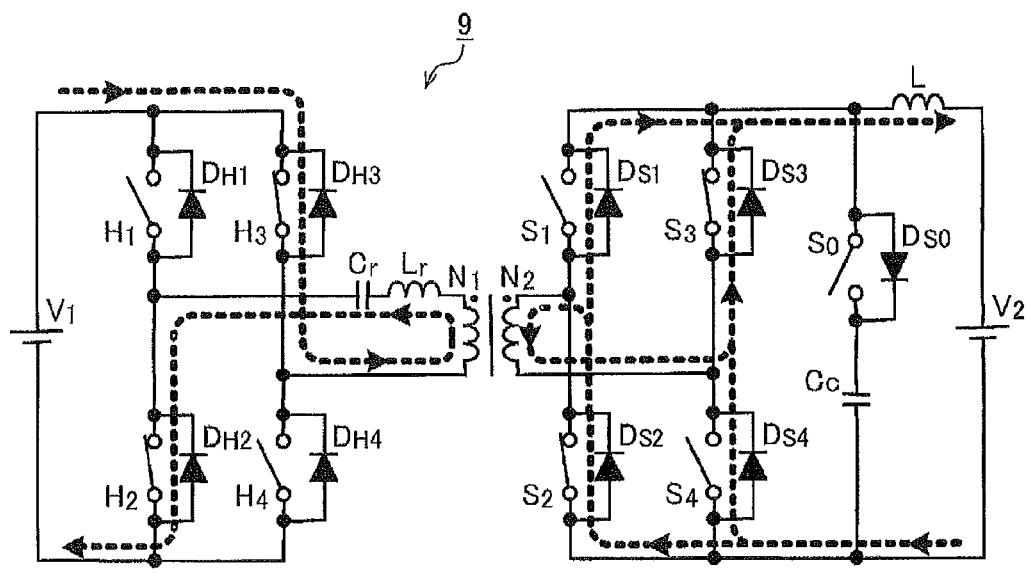
FIG. 6 is an illustration indicating a mode a5 of the step-down operation of the DC-DC converter according to the first embodiment.

FIG. 6 is an illustration indicating a mode a5 of the step-down operation of the DC-DC converter 9 according to the first embodiment.

In the mode a4 (see FIG. 5), after the current decreases and reaches zero, the current flowing state becomes the mode a5 shown in FIG. 6. Because the switching devices H2, H3 are in the turning on state, the current in the resonating inductor Lr inversely increases. As a result, the currents flowing through the winding N1, N2 in the windings N1, N2 changes in flowing direction, and the currents of the diodes DS1, DS2 are decreasing.

Figure 7:
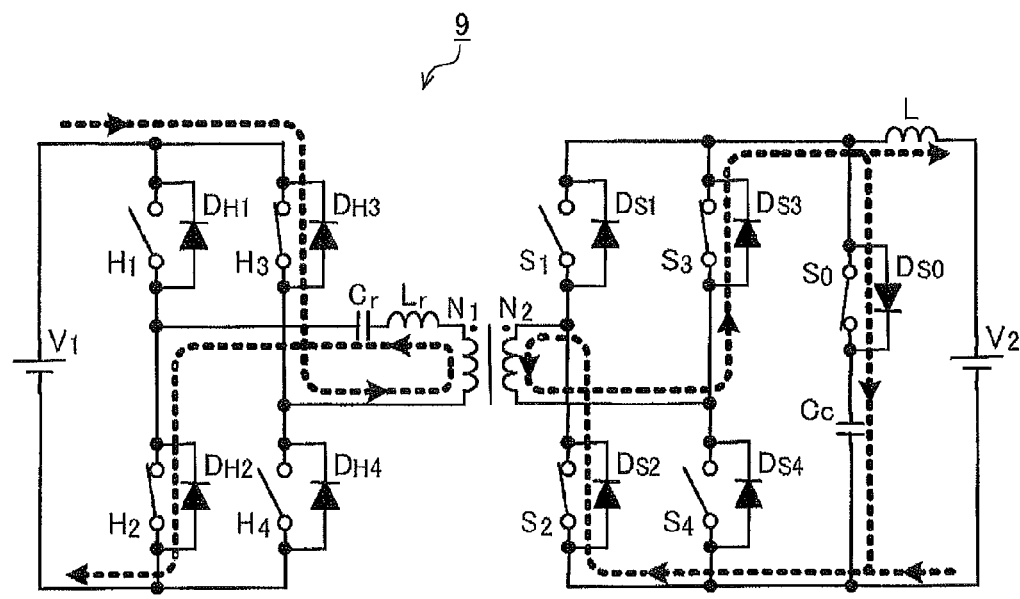
FIG. 7 is an illustration indicating a mode a6 of the step-down operation of the DC-DC converter according to the first embodiment.

FIG. 7 is an illustration indicating a mode a6 of the step-down operation of the DC-DC converter 9 according to the first embodiment.

In the mode a5, when the current in the winding N2 reaches the current of the smoothing inductor L, and the currents in the diodes DS1, DS4 reach zero, reverse recovery currents flow through the diodes DS1, DS4. After that, when the diodes DS1, DS4 are reversely recovered, the reverse recovery currents are commutated to a diode DH0. As a result, the state becomes a mode a6. At this instance, the controller 5 turns on the switching device S0 (zero voltage switching). The controller 5 detects the commutation to the diode DS0 by detecting, for example, a voltage increase of the clamp capacitor Cc with the voltage sensor 10.

The voltage of the DC power source V1 is applied to the winding N1. The voltage generated at the winding N2 is applied to the smoothing inductor L and the DC power source V2 through diodes DS2, DS3 and a current in the smoothing inductor L is supplied to the DC power source V2. Further, the voltage generated at the winding N2 is applied to the clamp capacitor Cc, so that the clamp capacitor Cc is charged.

The mode a6 is a symmetrical operation (an inverted current mode) with the mode a1 (see FIG. 2). After this, the DC-DC converter 9 returns to the mode a1 (see FIG. 2) after the symmetrical operations of the modes a1 to a5.

As described above, the voltage between the DC terminals of the switching circuit 2 varies for one switching period. On the other hand, the smoothing capacitor C2 (see FIG. 1), i.e., the voltage of the DC power source V2, substantially keeps at a predetermined value throughout one switching period. Further, generally, an average value of the both terminal voltage of the inductor for one switching period in a static condition becomes zero. Further, the clamp capacitor Cc is charged with a substantially peak voltage between the DC terminals of the switching circuit 2. Accordingly, during the step-down operation, the clamp capacitor Cc is charged to a voltage higher than the voltage of the smoothing capacitor C2. The voltage of the smoothing capacitor C2 means an output voltage.

Referring to FIG. 8 to FIG. 15, a step-up operation in which a power is supplied from the DC power source V2 to the DC power source V1. FIGS. 8 to 15 illustrate circuit operations in modes b1 to b8, respectively.

Figure 8:
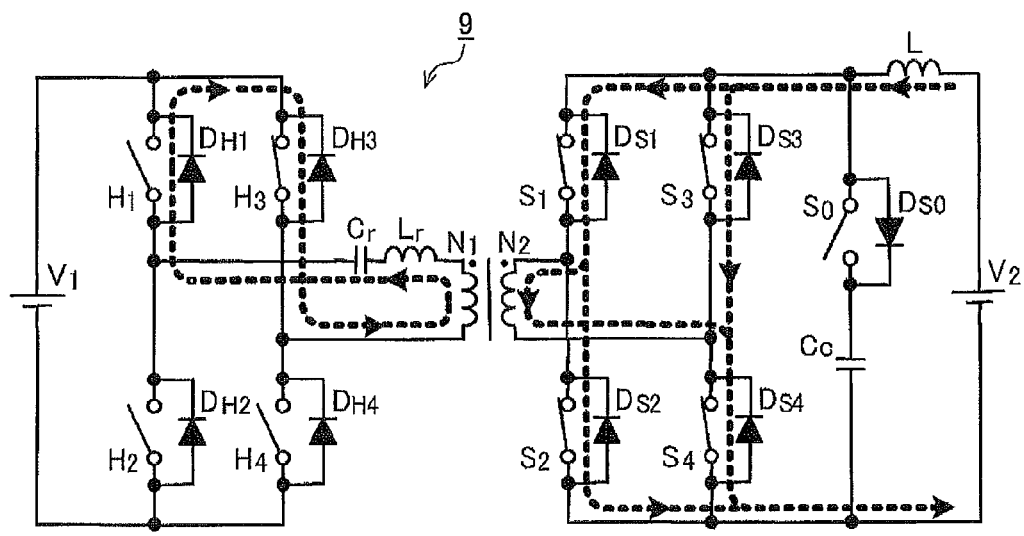
FIG. 8 is an illustration indicating a mode b1 of the step-up operation of the DC-DC converter according to the first embodiment.

FIG. 8 shows a mode b1 of the step-up operation of the DC-DC converter 9 in the first embodiment.

In the mode b1 shown in FIG. 8, the switching devices S1 to S4 are in the ON states, and the switching device S0 is in the OFF state. The voltage of the DC power source V2 is applied to the smoothing inductor L which stores the energy. Further, the switching devices H1, H2, H4 are in the OFF states, and the switching device H3 is in the ON state. In the resonating inductor Lr, a current flows in a route via the resonating capacitor Cr, the diode DH1, the switching device H3, and the winding N1.

Figure 9:
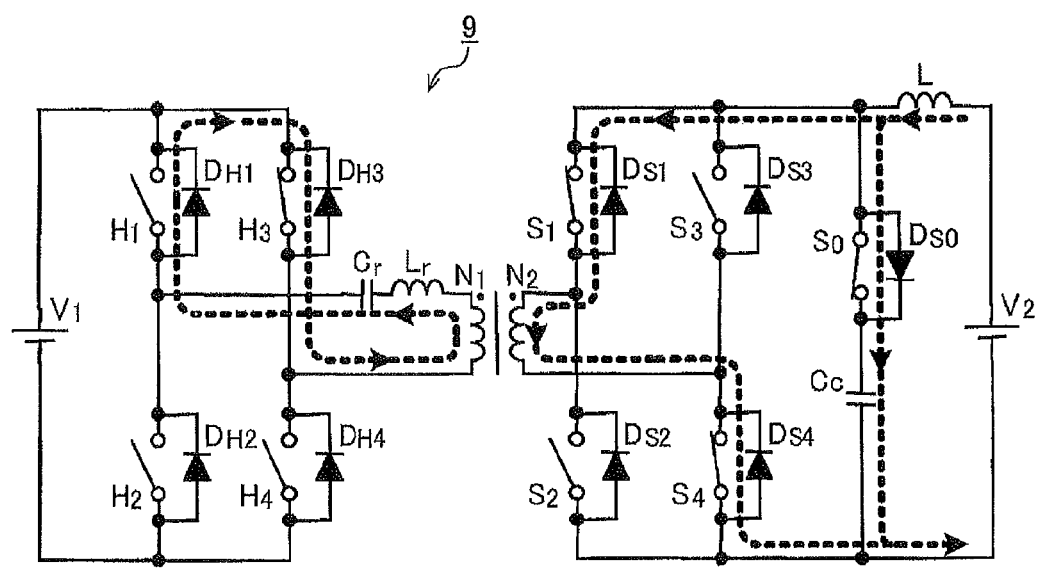
FIG. 9 is an illustration indicating a mode b2 of the step-up operation of the DC-DC converter according to the first embodiment.

FIG. 9 is an illustration indicating a mode b2 of the step-up operation of the DC-DC converter 9 according to the first embodiment.

In a mode b1 (see FIG. 8), when the controller 5 turns off the switching devices S2 and S3, currents flowing through the switching devices S2 and S3 are commutated to the diode DS0 and charges the clamp capacitor Cc. As a result, the current flowing state becomes the mode b2 shown in FIG. 9. At this instance, the controller 5 turns on the switching device S0 (zero voltage switching). A voltage of the clamp capacitor Cc is applied to the winding N2 which generates a voltage at the winding N1. Because the voltage of the winding N1 is applied to the resonating inductor Lr, the current in the resonating inductor Lr increases. The energy stored in the smoothing inductor L is being discharged.

Figure 10:
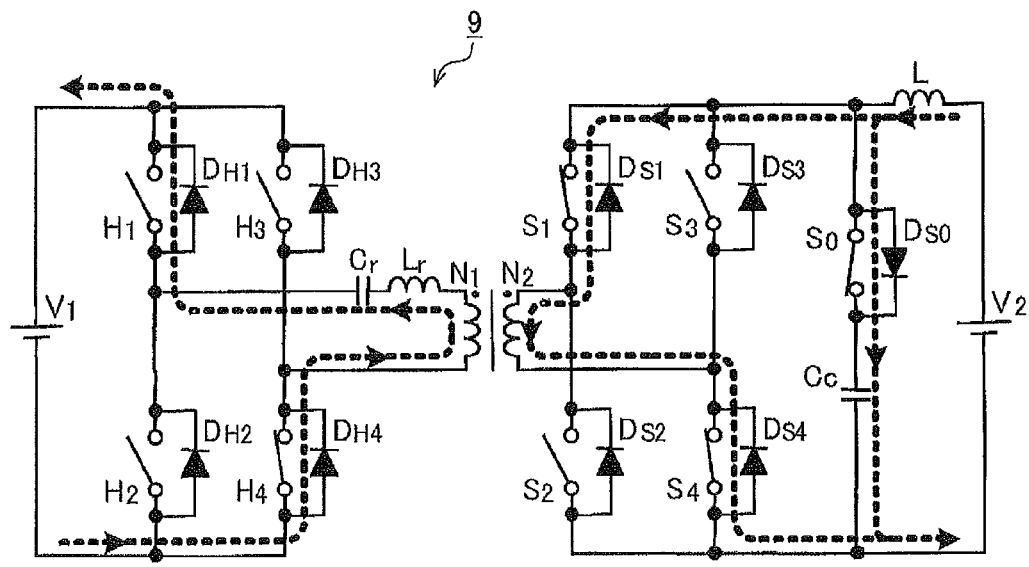
FIG. 10 is an illustration indicating a mode b3 of the step-up operation of the DC-DC converter according to the first embodiment.

FIG. 10 is an illustration indicating a mode b3 of the step-up operation of the DC-DC converter 9 according to the first embodiment.

In a mode b2 (see FIG. 9), when the controller 5 turns off the switching device H3, the current flowing through the switching device H3 is commutated to a diode DH4, so that the status becomes a mode b3 shown in FIG. 10. At this instance, the controller 5 turns on the switching device H4 (zero voltage switching). The current flowing through the resonating inductor Lr flows to the DC power source V1 through a route via the resonating capacitor Cr and the diode DH1, and the current flows from the DC power source V1 through a route via the diode DH4 and the winding N1. Accordingly the energy is stored in the DC power source V1.

Figure 11:
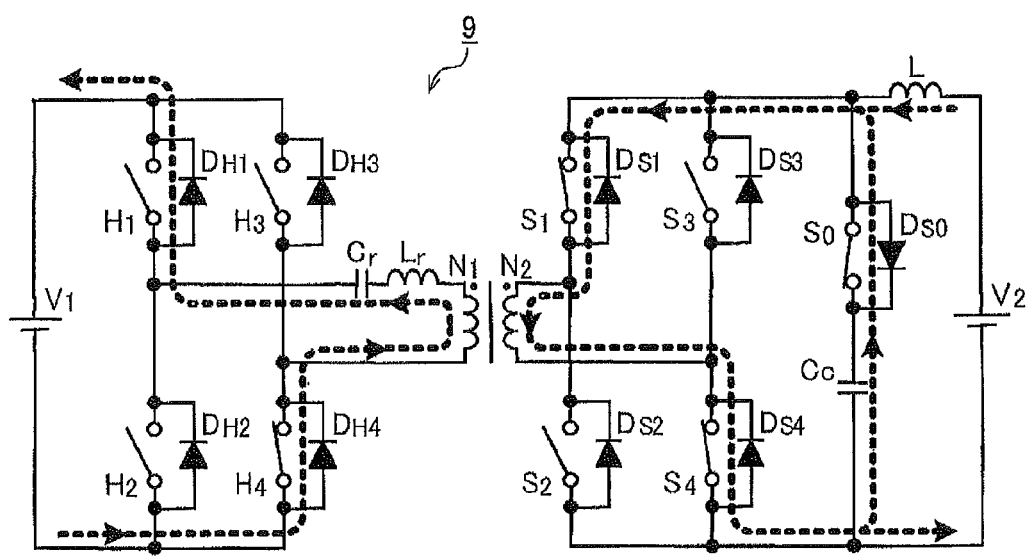
FIG. 11 is an illustration indicating a mode b4 of the step-up operation of the DC-DC converter according to the first embodiment.

FIG. 11 is an illustration indicating a mode b4 of the step-up operation of the DC-DC converter 9 according to the first embodiment.

In the mode b3 (see FIG. 10), with increase in current in the resonating inductor Lr, a charging current to the clamp capacitor Cc becomes decreased and when the state turns to discharging, the status becomes a mode b4 shown in FIG. 11. Because the switching device S0 is in the ON state, the voltage in the clamp capacitor Cc is continuously applied to the winding N2.

Figure 12:
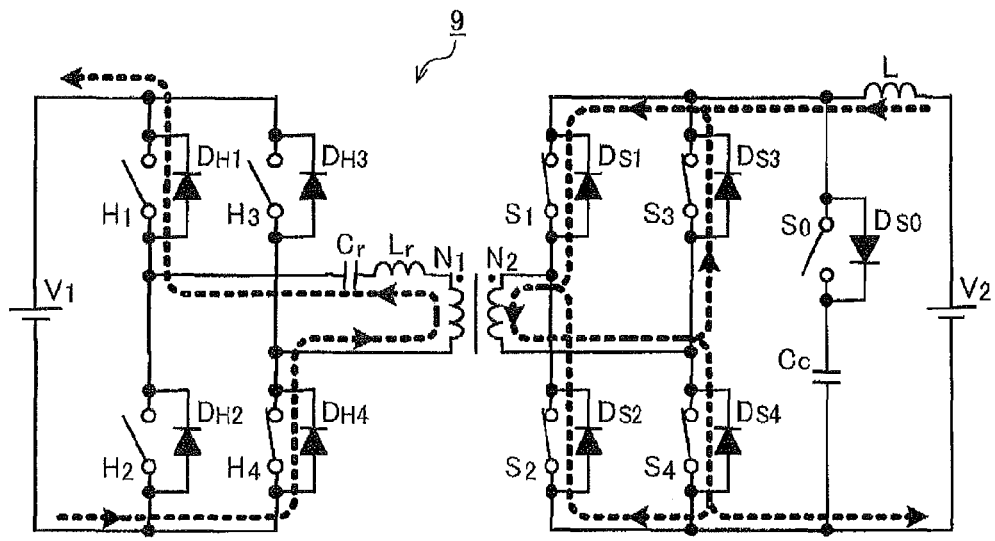
FIG. 12 is an illustration indicating a mode b5 of the step-up operation of the DC-DC converter according to the first embodiment.

FIG. 12 is an illustration indicating a mode b5 of the step-up operation of the DC-DC converter 9 according to the first embodiment.

In the mode b4 (see FIG. 11), the controller 5 turns off the switching device S0, the discharging current of the clamp capacitor Cc flowing through the switching device S0 is commutated to the diodes DS2, DS3, and the status becomes a mode b5 shown in FIG. 12. At this instance the controller 5 turns on the switching devices S2, S3 (zero voltage switching). Because it is stopped that the voltage of the clamp capacitor Cc is applied to the winding N2, no voltage is generated in the winding N1, so that the voltage of the DC power source V1 is applied to the resonating inductor Lr, and the current in the resonating inductor Lr becomes smaller and smaller. Further, like the mode b1 the energy in the DC power source V2 is stored in the smoothing inductor L.

Figure 13:
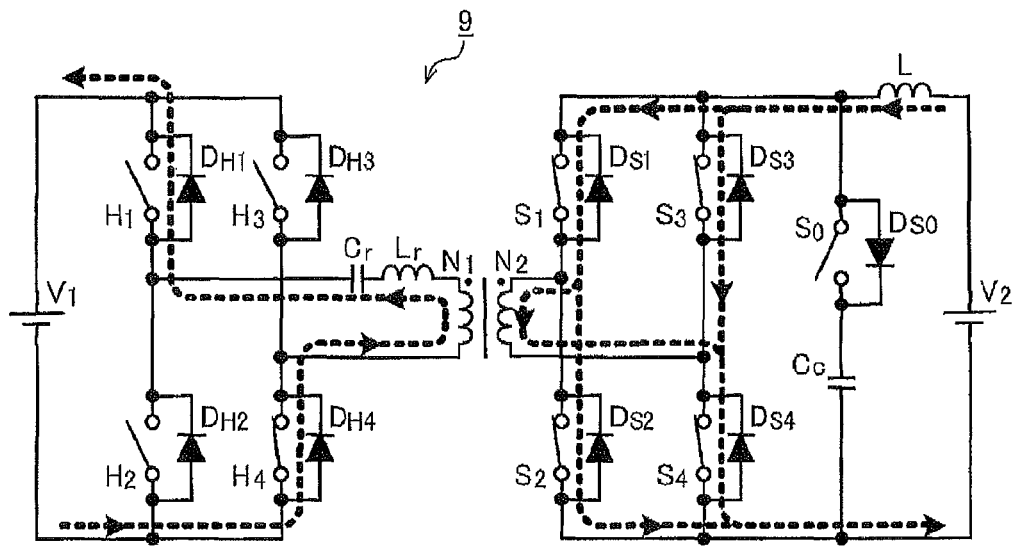
FIG. 13 is an illustration indicating a mode b6 of the step-up operation of the DC-DC converter according to the first embodiment.

FIG. 13 is an illustration indicating a mode b6 of the step-up operation of the DC-DC converter 9 according to the first embodiment.

In the mode b5, with the decrease in the current in the resonating inductor Lr, when directions of the currents in the switching devices S2, S3 are inverted, the situation becomes a mode b6 shown in FIG. 13.

Figure 14:
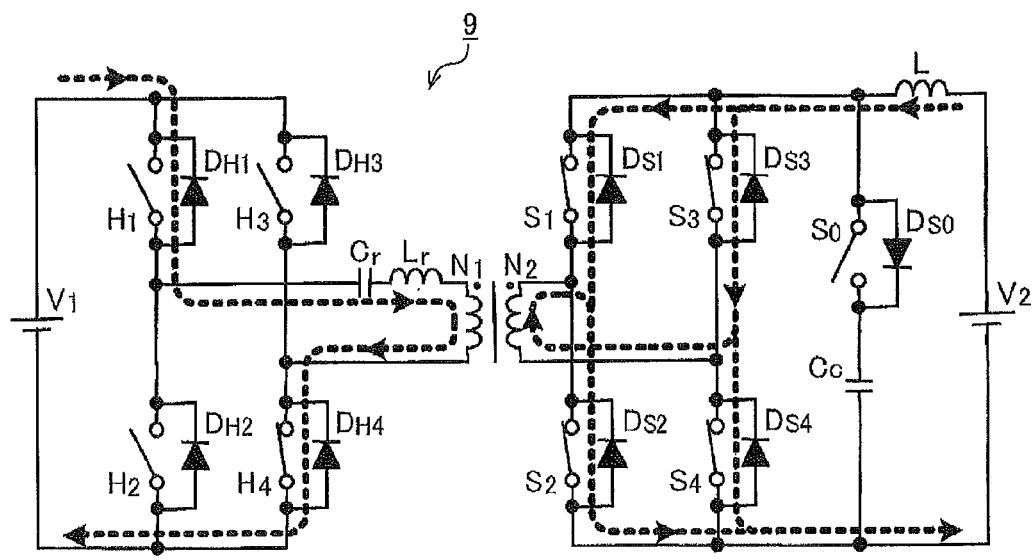
FIG. 14 is an illustration indicating a mode b7 of the step-up operation of the DC-DC converter according to the first embodiment.

FIG. 14 is an illustration indicating a mode b7 of the step-up operation of the DC-DC converter 9 according to the first embodiment.

In the mode b6 (see FIG. 13), when the current in the Lr further decreases and reaches zero volt, the state becomes the mode b7. Because the switching device H4 is in the ON state, a reverse recovery current of the diode DH1 flows through a route via the resonating capacitor Cr, the resonating inductor Lr, the winding N1, and the switching device H4 and an energy of the reverse recovery current is stored in the resonating inductor Lr.

Figure 15:
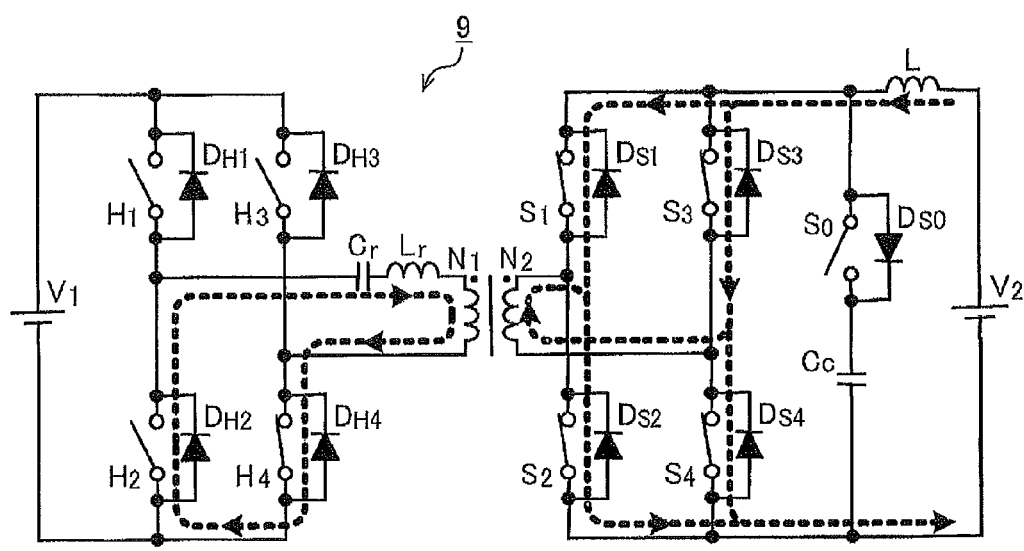
FIG. 15 is an illustration indicating a mode b8 of the step-up operation of the DC-DC converter according to the first embodiment.

FIG. 15 is an illustration indicating a mode b8 of the step-up operation of the DC-DC converter 9 according to the first embodiment.

When the diode DH1 reversely recovers in the mode b7 (see FIG. 14), the reverse recovery current is commutated to the diode DH2 and the status becomes the mode b8 shown in FIG. 15. The reverse recovery current of the diode DH1 collected by the resonating inductor Lr generates a circulation current through a route via the switching device H4, the diode DH2, the resonating capacitor Cr, the resonating inductor Lr, and the winding N1.

The mode b8 is a symmetrical operation (inverted current mode) of the mode b1. After this, the DC-DC converter 9 returns the mode b1 (see FIG. 8) after the symmetrical operation of the mode b2 and the mode b7.

As described above, the clamp capacitor Cc is charged to a voltage higher than the input voltage, i.e., the voltage of the smoothing capacitor C2 (see FIG. 1), like the step-down operation.

In the step-up operation, basically the output voltage is increased and decreased by varying a period of the modes b5 to b8 in which all the switching devices S1 to S4 are kept in the ON states.

FIG. 16A to FIG. 18E show waveforms VgS0 to VgS4 indicating ON/OFF states of the switching devices S0 to S4 in the step-up operation FIGS. 16A to 16E are timing charts showing switching operation (#1) of the step-up operation of the DC-DC converter 9 in the first embodiment.

At time t0a, the switching device S0 turns off and the switching devices S2, S3 turn on. The switching devices S1, S4 keep the ON states.

At time t1a, the switching device S0 turns on and the switching devices S1, S4 turn off. The switching devices S2, S3 keep the ON states.

At time t2a, the switching device S0 turns off, and the switching devices S1, S4 turn off. The switching devices S2, S3 keep the ON states.

At time t3a, the switching device S0 turns on, and the switching devices S2, S3 turn off. The switching devices S1, S4 keep the ON states. After this, each of the switching devices repeats the operation similarly.

Time period from time t0a to time t1a corresponds to a period during the modes b5 to b8. The switching device S0 is in the ON state in a period except a period for which all the switching devices S1 to S4 are in the ON states.

FIGS. 17A to 17E are timing charts showing switching operation (#2) of the step-up operation of the DC-DC converter 9 in the first embodiment.

Time t0b to t3b correspond to the time t0a to t3a shown in FIGS. 16A to 16E.

After the switching operation shown in FIGS. 16A to 16E, as shown in FIGS. 17A to 17E, shortening the periods for which the switching devices S1 to S4 are each in the ON states shortens the period for which all the switching devices S1 to S4 are kept in the ON states, so that the output power decreases. In this condition, the ON period of the switching device S0 extends. As described above, when the ON periods of the switching devices S1 to S4 are shortened, the ON period of the S0 becomes longer.

FIGS. 18A to 18E are timing charts showing switching operation (#3) of the step-up operation of the DC-DC converter 9 in the first embodiment.

After the switching operations in FIGS. 17A to 17E, the controller 5 shortens the ON periods of the respective switching devices S1 to S4 to further decrease the output power. This eliminates the period for which all the switching devices S1 to S4 are in the ON states, so that the switching device S0 is always in the ON state.

More specifically, at time t10, the switching devices S2, S3 turn ON. The switching device S1 keeps the ON state. The switching devices S1, S4 keep the OFF states.

At time t11, the switching devices S2, S3 turn off. The switching device S0 keeps the ON state. The switching devices S1, S4 keep the OFF states.

At time t12, the switching devices S1, S4 turn on. The switching device S0 keeps the ON state. The switching devices S2, S3 keep the OFF states.

At time t13, the switching devices S1, S4 turn off. The switching device S0 keeps the ON state. The switching devices S2, S3 keep the OFF states. After this, the respective switching devices repeat similar operations.

Generally, in the DC-DC converter, when the power conversion operation is started, the operation is started in a status in which the output power is restricted to prevent an excessive current from flowing in the circuit, and the output power is gradually increased. In the DC-DC converter 9 in the first embodiment, when the step-up operation is started when the output power is restricted, as described above, the step-up operation is started when the ON time period ratios of the switching devices S1 to S4 are low, on the other hand, the ON time period ratio of the switching devices S0 is high.

However, the clamp capacitor Cc of the DC-DC converter 9 is charged to a voltage higher than the output voltage in the step-down operation and the input voltage in the step-up operation. The voltage of the clamp capacitor Cc remains after the step-down operation and the step-up operation. Further, the output voltage in the step-down operation and the input voltage in the step-up operation are the voltage of the smoothing capacitor C2 (see FIG. 1). Accordingly, when the step-up operation is started when the voltage remains in the clamp capacitor Cc, there may be a case where an excessive current flows through the switching device S0 and the smoothing inductor L because the ON time period ration of the switching device S0 is high.

Then, in the DC-DC converter 9 in the first embodiment, the voltage remaining in the clamp capacitor Cc is discharged by the following discharging operation when the step-down operation and the step-up operation are stopped.

Figure 19:
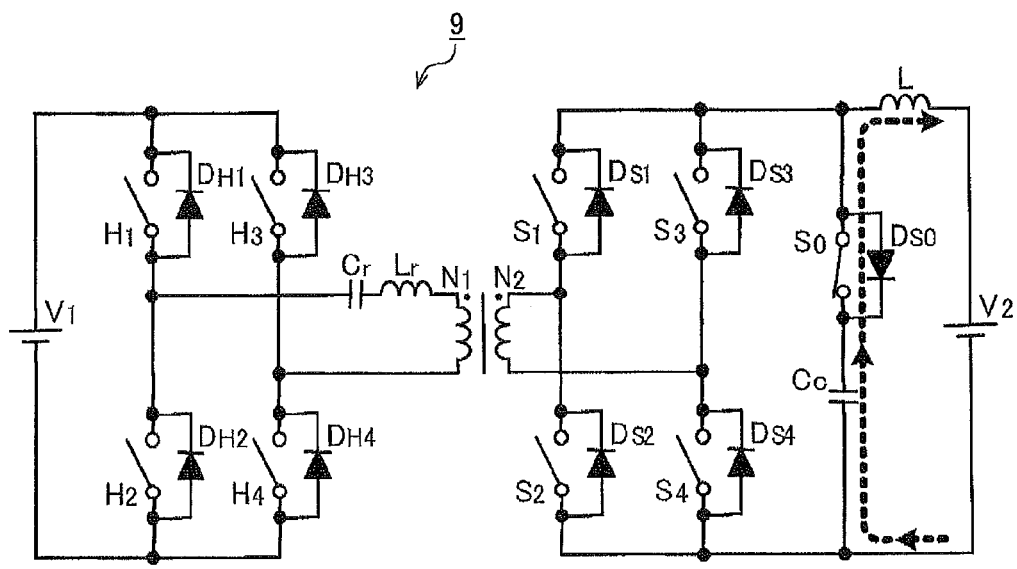
FIG. 19 is an illustration indicating a mode c1 of the discharge operation of the DC-DC converter according to the first embodiment.
Figure 20:
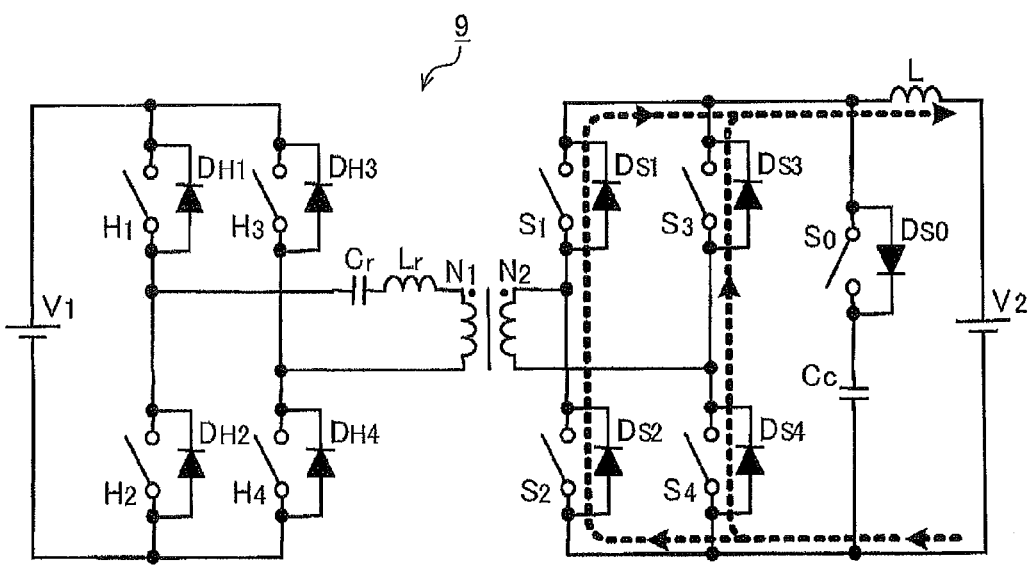
FIG. 20 is an illustration indicating a mode c2 of the discharge operation of the DC-DC converter according to the first embodiment.
Figure 21:
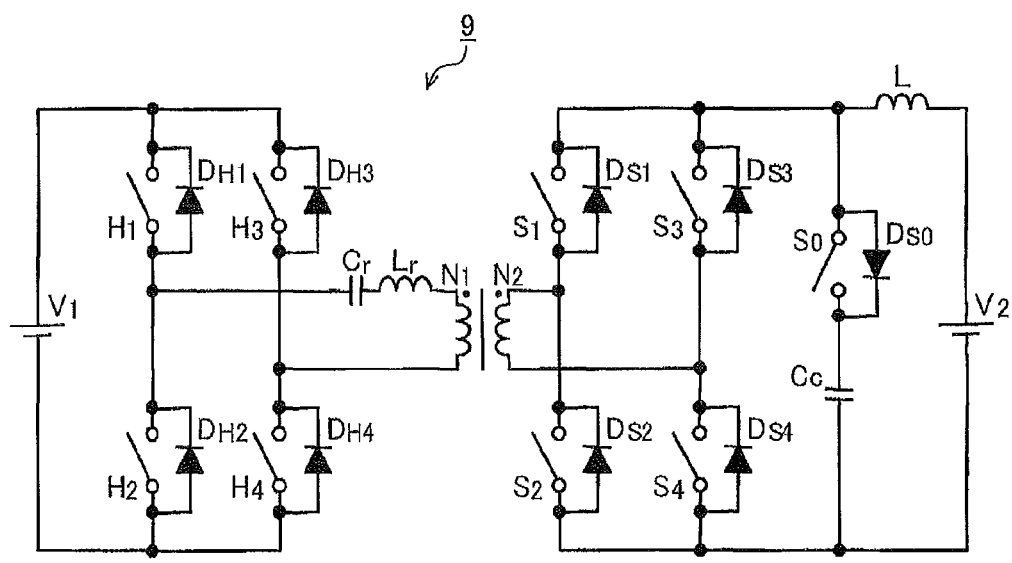
FIG. 21 is an illustration indicating a mode c3 of the discharge operation of the DC-DC converter according to the first embodiment.

The discharge operation is described with reference to FIGS. 19 to 21 in which the voltage remaining in the clamp capacitor Cc is discharged to the DC power source V2. FIGS. 19 to 21 illustrate circuit operations in modes c1 to c3.

FIG. 19 is an illustration indicating the mode c1 of the discharging operation of the DC-DC converter 9 according to the first embodiment.

As shown in FIG. 19, in the mode c1, the switching device S0 is in the ON state, and the switching devices S1 to S4 are in the OFF states. The voltage of the clamp capacitor Cc is applied to the smoothing inductor L and the DC power source V2, so that a current in the smoothing inductor L is increasing. Charges in the clamp capacitor Cc are discharged to the DC power source V2 through the switching device S0 and the smoothing inductor L.

FIG. 20 is a mode illustration indicating a mode c2 of the discharging operation of the DC-DC converter 9 according to the first embodiment.

In the mode c1 (see FIG. 19), when the switching device S0 is turned off, the current flowing through the switching device S0 is commutated to the diodes DS1 to DS4, so that the state becomes the mode c2 shown in FIG. 20. The voltage of the DC power source V2 is applied to the smoothing inductor L and the current in the smoothing inductor L decreases.

FIG. 21 is an illustration indicating a mode c3 of the discharging operation of the DC-DC converter 9 according to the first embodiment.

When the current in the smoothing inductor L further decreases and reaches zero, there are no current flowing in the circuit, so that the state becomes the mode c3 shown in FIG. 21. In this condition, in accordance with reverse recovery currents in the diodes DS1 to DS4 and electric static capacitive components of the switching devices S0 to S4, there may be a case where a vibration current flows through the smoothing inductor L.

After this, the DC-DC converter 9 repeats the modes c1 to c3.

In the discharging operation, the currents flowing in the switching device S0 and the smoothing inductor L can be decreased and increased in magnitude by changing the period of the mode c1. To discharge the clamp capacitor Cc for a shorter time interval to about the voltage of the DC power source V2, it is desirable to increase the current of the smoothing inductor L within a range where no trouble occurs in the circuit components. To increase the current in the smoothing inductor L, the period of the mode c1 is expanded by expanding the ON period of the switching device S0. In this operation, the current in the smoothing inductor L can be more increased by lowering the switching frequency of the switching device S0 than those in the step-down operation and the step-up operation.

Further, in the discharging operation described above, there may be a case where switching noises can be reduced when the state is brought into the mode c1 by turning on the switching device S0 immediately after the state becomes the mode c3. In the mode c2, when the state is brought into the mode c1 by turning on the switching device S0 before the current in the smoothing inductor L becomes zero in the mode c2, the current in the smoothing inductor L can be kept to be large, so that the discharging of the clamp capacitor Cc can be completed in a further short time interval.

Figure 22:
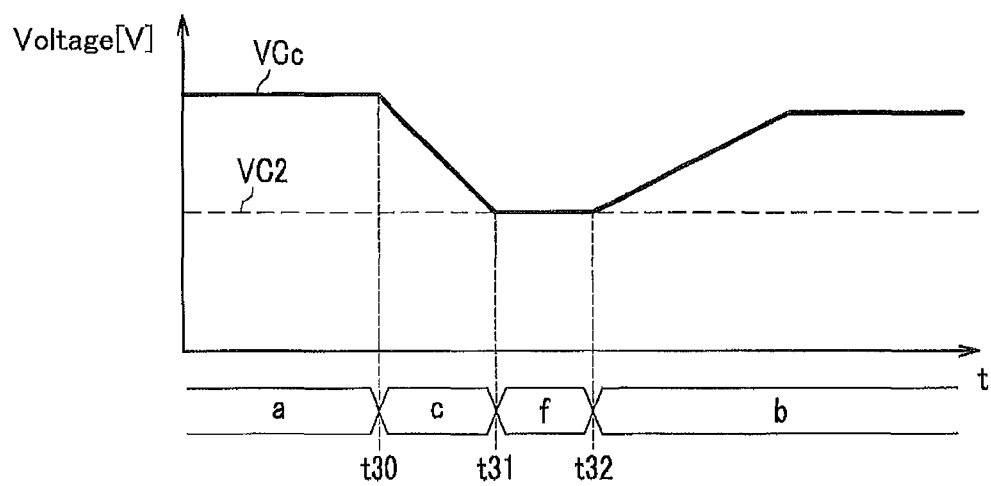
FIG. 22 is an illustration for showing switchover from the step-down operation to the step-up operation of the DC-DC converter according to the first embodiment.

FIG. 22 is an illustration for showing switchover from the step-down operation to the step-up operation of the DC-DC converter 9 according to the first embodiment.

As shown in FIG. 22, a voltage VCc is applied between both terminals of the clamp capacitor Cc. A voltage VC2 is applied between both terminals of a smoothing capacitor C2.

In a period (a) prior to time 30, the DC-DC converter 9 repeats an operation of the modes a1 to the mode a5, which are step-down operations (see FIGS. 2 to 6) and their symmetrical operations (inverted current mode). During the operations, the voltage VCc of the clamp capacitor Cc is higher than the voltage VC2 of the smoothing capacitor C2.

In the period (c) from time t30 to time t31, the DC-DC converter 9 repeats the discharge operation from the mode c1 to the mode c3. This discharges charges in the clamp capacitor Cc.

At time t31, when the voltage VCc of the clamp capacitor Cc decreases down to about the voltage VC2 of the smoothing capacitor C2, the DC-DC converter 9 make a transition to a period (f).

In the period (f) from time t31 to time t32, the DC-DC converter 9 performs the step-up operation shown in FIG. 18. In FIG. 18, when the controller 5 increases the ON period of the switching devices S1 to S4, an OFF period occurs at the switching device S0, the DC-DC converter 9 makes transition to the step-up operation shown in FIG. 17 and to the period (b).

In the period (b), which is after time t32, the DC-DC converter 9 performs the step-up operation shown in FIGS. 17A to 17E at an initial stage and after that, an operation shown in FIGS. 16A to 16E. The controller 5 gradually increases the ON period of the switching devices S1 to S4, so that the voltage VCc of the clamp capacitor Cc also increases.

As described above, the DC-DC converter 9 according to the first embodiment performs the discharging operation to decrease the voltage of the clamp capacitor Cc between the step-down operation and the step-up operation when the step-up operation is performed after the step-down operation. This enables to rapidly decrease the voltage of the clamp capacitor Cc, which has been charged in the step-down operation, so that the step-up operation can be started within a short time interval.

Further the DC-DC converter 9 can be provided at a low cost because the discharging is made by switching the switching device S0 without using a circuit for discharging the clamp capacitor Cc.

The DC-DC converter 9 can rapidly decrease the voltage of the clamp capacitor Cc by performing the discharge operation also during the stop of the step-up operation to suppress an over current occurring when next the step-up operation is started. The DC-DC converter 9 also can suppress the over current occurring when the step-up operation is re-started by re-starting the step-up operation through the discharging operation after interruption of the step-up operation.

Modification of the First Embodiment

In the discharging operation shown in FIG. 22, the controller 5 can make discharging from the clamp capacitor Cc to the DC power source V1 by causing switching operations at the switching devices S1 to S4 other than the switching device S0. In this modification, the DC-DC converter 9 performs such a switching operation.

FIG. 23 is a timing chart illustrating a switching operation of the step-up operations according to a modification of the DC-DC converter 9 used in the first embodiment modification.

At time t20, the switching devices S0, S2, S3 turn on. The switching devices S1, S4 keep turning-off.

At time t21, the switching devices S0, S2, S3 turn off. The switching devices S1, S4 keep turning-off, At time t22, the switching devices S0, S1, S4 turn on. The switching devices S2, S3 keep turning-off.

At time t23, the switching devices S0, S1, S4 turn off. The switching devices S2, S3 keep turning-off. Hereinafter, respective switching devices repeat a similar operation.

The controller 5 controls the switching device S0 to turn off when the switching devices S1 to S4 included in the switching circuit 2, are all in OFF states. Accordingly, the DC-DC converter 9 gradually discharges the clamp capacitor Cc and can make transition to the step-up operation smoothly.

FIG. 24 illustrates the switchover from the step-down operation of the DC-DC converter 9 in the first embodiment to a step-up operation according to the modification.

In a period (a) which is prior to time t40, the DC-DC converter 9 repeats the modes a1 to a5 (see FIGS. 2 to 6), which are step-down operations, and symmetrical operations. During this the voltage VCc of the clamp capacitor Cc becomes higher than the voltage VC2 of the smoothing capacitor C2.

In a period (e) between time t40 to t42, the DC-DC converter 9 repeats the control shown in FIG. 23. This causes the clamp capacitor Cc to discharge charges therein. This control makes a gradual decrease in the voltage VCc of the clamp capacitor Cc, and after time t41, the variation turns to increasing and converges to a predetermined voltage.

As shown in FIG. 24, in the discharging operation in the period (e), the voltage VCc of the clamp capacitor Cc can be made continuous to the voltage during the step-up operation in the period (e) without decrease in the voltage VCc to the voltage VC2 of the smoothing capacitor C2. As a result of the above-described operations, the DC-DC converter 9 of the modification can re-start the power supplying to the DC power source V1 just after stop of the step-down operation in the period (a).

Second Embodiment

Figure 25:
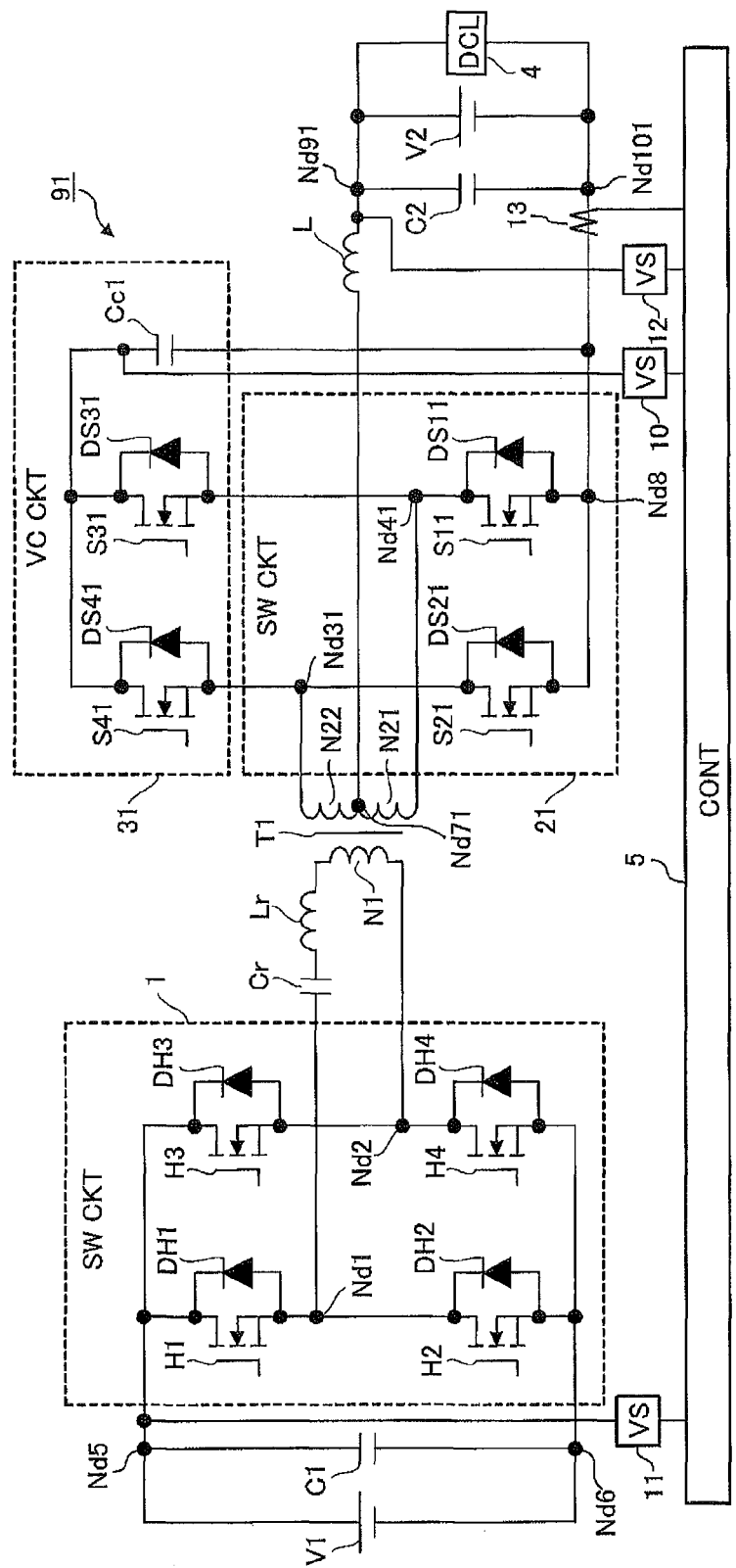
FIG. 25 is a schematic circuit diagram the DC-DC converter according to a second embodiment.

FIG. 25 is a schematic circuit diagram of a DC-DC converting system 191 including the DC-DC converter 91 according to a second embodiment.

As shown in FIG. 25, a DC-DC converter 91 according to the second embodiment includes the switching circuit 1 which is similar to the switching circuit in the DC-DC converter 9 (see FIG. 1), a switching circuit 21 different from that in the first embodiment, a voltage clamp circuit 31, and the controller 5 for controlling states of respective switching devices included in these circuits between ON and OFF. The DC-DC converter 91 according to the second embodiment is connected between the DC power source V1 and the DC power source V2 connected to the DC load 4 like the first embodiment. The DC-DC converter 91 supplies a power from the DC power source V1 to the DC load 4 and the DC power source V2 and a power from the DC power source V2 to the DC power source V1.

The switching circuit 1 has a structure which is similar to that of the first embodiment.

The smoothing inductor L and the smoothing capacitor C2 (second smoothing capacitor) are connected between a node Nd71 and a node Nd8, which are DC terminals of the switching circuit 21. An end of the switching circuit 21 (first secondary winding) and an end of a winding N22 (second secondary winding) are connected to the node Nd71. Another end of the DC-DC converter N22 and another end of a winding N21 are connected between a node Nd31 and a node Nd41, which are AC terminals of the switching circuit 2.

A transformer T1 provides magnetic coupling between the winding N1 and the windings N21, N22, which are secondary windings provided by center-tapping.

Both ends (first terminals) of the smoothing capacitor C1 connected to the switching circuit 1 are the nodes Nd5, Nd6. Both ends (second terminals) of the smoothing capacitor C2 connected to the switching circuit 21 are nodes Nd91, Nd101. The nodes Nd5, Nd6 and the nodes Nd91, Nd101 are input-output terminals of the DC-DC converter 91. The DC power source V1 is connected between the nodes Nd5, Nd6 to have a parallel connection. The DC power source V2 is connected between the nodes Nd91, Nd92 to have a parallel connection.

In the switching circuit 21, another end of the winding N21 is connected to the one end of a switching device S11 via the node Nd41, and another end of the winding N22 is connected to the one end of a switching device S21 via the node Nd31. Further in the switching circuit 21, another end of the switching device S11 is connected to the another end of the switching device S21 via the node Nd8. DC terminals of the switching circuit 21 are the node Nd71 and the node Nd8, the node Nd71 being a connection point of the windings N21, N22. AC terminals of the switching circuit 21 are the nodes Nd31, Nd41. The node Nd71, Nd8, which are DC terminals of the switching circuit 21, are connected to a circuit including the smoothing inductor L and the smoothing capacitor C2 (second smoothing capacitor) connected in series.

The voltage clamp circuit 31 includes switching devices S31, S41, and a clamp capacitor Cc1. One end of the switching device S31 is connected to one end of the switching device S41 and one end of the clamp capacitor Cc1. Another end of the switching device S31 is connected to the node Nd41. Another end of the switching device S41 is connected to the node Nd32. Another end of the clamp capacitor Cc1 is connected to a node Nd101, which is one end of the smoothing capacitor C2.

The switching devices H1 to H4, S11, S21, S31, S41 are connected to have anti-parallel connections with the diodes DH1 to DH4, DS11, DS21, and DS41, respectively.

As described above, in the DC-DC converter 91 according to the second embodiment, the switching circuit 21 can be configured using two switching devices S11, S21. Accordingly, the number of the switching devices can be decreased as compared with the switching circuit 2 in the first embodiment.

In the second embodiment, the same advantageous effect, which is similar to the first embodiment, can be obtained.

Third Embodiment

Figure 26:
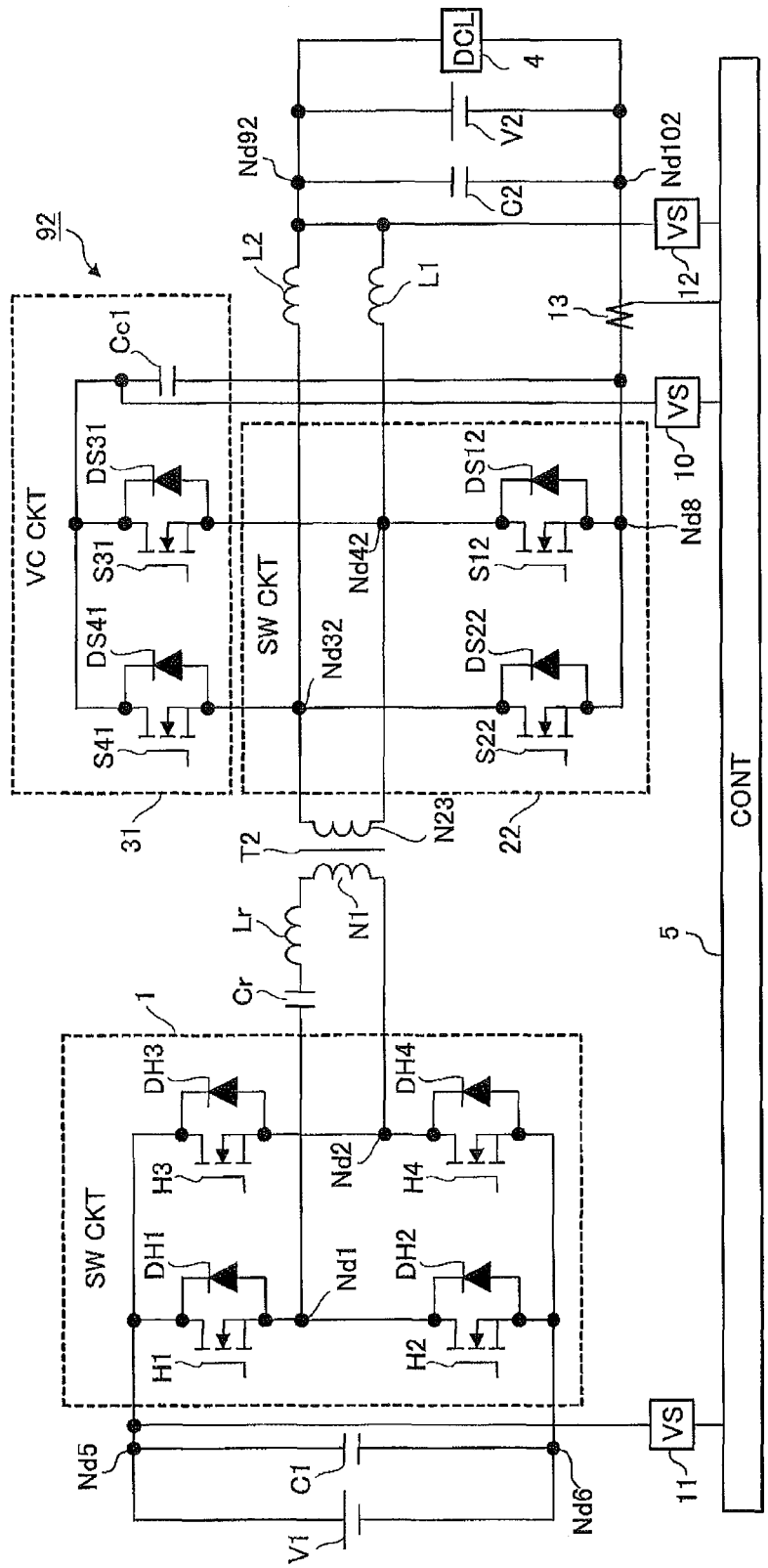
FIG. 26 is a schematic circuit diagram the DC-DC converter according to a third embodiment.

FIG. 26 is a circuit diagram of a DC-DC converting system 192 including a DC-DC converter 92 according to the present invention. As shown in FIG. 26, the DC-DC converter 92 according to the third embodiment includes the switching circuit 1, which is similar to the DC-DC converter 9 and a switching circuit 22, which are different from the switching circuit of the first embodiment, the voltage clamp circuit 31, and the controller 5 for controlling ON-OFF states of respective switching devices included in these circuits. The DC-DC converter 92 according to the third embodiment is connected between the DC power source V1 and the DC power source V2 connected to the DC load 4. The DC-DC converter 92 is a device for supplying a power from the DC power source V1 to the DC load 4 or the DC power source V2 and a power from the DC power source V2 to the DC power source V1.

The switching circuit 1 is configured similarly to the first embodiment.

The switching circuit 22 is connected to the smoothing capacitor C2 through smoothing inductors L1, L2. One end of the smoothing inductor L1 (first smoothing inductor) is connected to one end of a smoothing inductor L2 (second smoothing inductor) at a node (a connecting member) Nd92. The smoothing capacitor C2 is connected to the DC power source V2 in parallel. A winding N23 is connected between nodes Nd32, Nd42, which are AC terminals of the switching circuit 22.

A transformer T2 provides magnetic coupling between the winding N1 and the winding N2.

Both ends of the smoothing capacitor C1 connected to the switching circuit 1 are nodes Nd5, Nd6, respectively. Both terminals (second terminals) of the smoothing capacitor C2 connected to the switching circuit 22 are the nodes Nd92, Nd102. A pair of the nodes Nd5, Nd6 and a pair of nodes Nd92, Nd102 are input-output terminals of the DC-DC converter 92. The DC power source V1 is connected to the nodes Nd5, Nd6 in parallel. The DC power source V2 is connected to the nodes Nd92, Nd102 in parallel.

In the switching circuit 22, one end of a switching device S12 is connected to one end of a switching device S22 at the node Nd8. Another end of switching device S12 is connected to another end of the smoothing inductor L1 at a node Nd42. Another end of a switching device S22 is connected to another end of the smoothing inductor L2 at the node Nd32.

The smoothing inductor L1 is connected to the smoothing inductor L2 at the node Nd92. The smoothing capacitor C2 is connected between a node Nd102 (node Nd8), which are a junction between the switching devices S12, S22, and the node Nd92.

In the switching circuit 22, the nodes Nd42, Nd8 which are both terminals of the switching device S12, are first DC terminals, and the node Nd32 and the node Nd8, which are both terminals of the switching device S22 are second DC terminals of the switching circuit 22. Further in the switching circuit 22, the nodes Nd32, Nd42 are AC terminals of the switching circuit 22.

The voltage clamp circuit 31 includes the switching devices S31, S41 and the clamp capacitor Cc1. In the voltage clamp circuit 31, one end of the switching device S31 is connected to one end of the switching device S41 and one end of the clamp capacitor Cc1. Another end of the switching device S31 is connected to the node Nd42. Another end of the switching device S41 is connected to the node Nd32. Another end of the clamp capacitor Cc1 is connected to the node Nd102 (node Nd8), which is one end of the smoothing capacitor C2.

The switching devices H1 to H4, S12, S22, S31, S41 are connected to diodes DH1 to DH4, DS12, DS22, DS31, and DS41 in anti-parallel connections, respectively.

As described above, the DC-DC converter 92 according to the third embodiment can be decreased in the number of the windings as compared with the DC-DC converter 91 according to the second embodiment.

The third embodiment provides advantageous effects which are similar to those of the first embodiment.

As described in the first to third embodiments, the present invention is widely applicable to DC-DC converters in which the voltage type switching circuit is coupled to a current type switching circuit including the smoothing inductor, and the voltage clamp circuit is connected to the current type switching circuit.

Modifications

The present invention is not limited to the above-described embodiments and has various modifications. For example, the above embodiments are described in detail to provide easily understandable explanation. However, the present invention is not limited to the configuration including all elements described above. A part of the embodiments can be replaced with another part of another embodiment. A configuration in one embodiment can be added to a configuration of another embodiment. Further, a part of each of the embodiments can be added to, omitted, or replaced with another configuration.

All of or a part of the respective configurations, functions, processing parts, and processing means, etc. can be realized by hardware such as an integrated circuit. All of or a part of the respective configurations, functions, etc. can be realized by software by executing a program to provide each of functions with a processor.

In each of embodiments, the control lines and data lines are shown for necessary explanation, but not necessarily show all control lines and data lines necessary for the products. In actual, all components are mutually connected.

There are modifications (a) to (c).

(a) The DC-DC converter according to the present invention can be built in, for example, a secondary battery charging and discharging system, an uninterruptible power supply, and an electric vehicle. In FIGS. 1, 25, and 26, for example, the DC-DC converting system 109 (191,192) may be the secondary battery charge and discharge system 109 (191, 192) which includes the DC-DC converter 9 (91, 92) and a secondary battery V2 connected to the DC-DC converter 9 (91, 92). The DC-DC converter 9 (91, 92) charges and discharges the secondary battery V2. In other words, the second DC power source V2 is a secondary battery.

(b) For the switching devices in the DC-DC converter according to the present invention, any semiconductor devices are available such as MOSFET, IGBT (Insulated Gate Bipolar Transistor), GTO (Gate Turn-Off thyristor). Integrated Circuit Field-Programmable Gate Array (c) The controller 5 according to the present invention may be configured with a custom IC (Integrated Circuit), FPGA (Field-Programmable Gate Array), or discrete components. Further, the controller 5 may be configured with a combination of a micro-computer and a software program read by the microcomputer.

As described above, there is provided an DC-DC converter comprising:
a first switching circuit including:
DC terminals and AC terminals;
a first smoothing capacitor connected between the DC terminals of the first switching circuit, and
a primary winding connected between the AC terminals of the first switching circuit;
a second switching circuit including:
DC terminals and AC terminals;
a series circuit including a smoothing inductor and a second smoothing capacitor connected in series, the series circuit being connected between the DC terminals of the second switching circuit, and
a secondary winging connected to the AC terminals of the second switching circuit;
a transformer providing magnetic coupling between the primary winding and the secondary winding;
a voltage clamp circuit including a clamp capacitor and a clamp switching device which are connected in series, the voltage clamp circuit being connected between DC terminals of the second switching circuit or between the AC terminals of the second switching circuit and one end of the second smoothing capacitor;
a controller operating either of a first mode or a second operation mode, wherein in the first mode, the controller outputs between the second terminals, which are both terminals of the second smoothing capacitor, a power inputted between first terminals, which are both terminals of the first smoothing capacitor, and in the second mode the controller outputs between the first terminals a power inputted between the second terminals, and wherein
in a third mode, the controller outputs, between at least one of the first terminals and the second terminals, a power discharged from the clamp capacitor by switching the clamp switching device, the third mode being performed between at least one of an interruption after the first mode and an interruption after the second mode and the second mode performed subsequent to at least one of the interruptions.

Further, there is provided a secondary battery charge and discharge system comprising: the DC-DC converter described above; and a secondary battery connected to the DC-DC converter, wherein the DC-DC converter charges and discharges the secondary battery V1 or V2.

LIST OF REFERENCES 1 switching circuit 1 (first switching circuit)
2, 21, 22 switching circuit (second switching circuit) (VC CKT)
3, 31 voltage clamp circuit (VC CKT) (DCL)
4 DC load (DCL) (CONT)
5 controller (CONT)
10, 11, 12 voltage sensor (VS)
13 current sensor
V1 DC power source (first DC power source)

V2 DC power source (second DC power source)
C1 smoothing capacitor C1 (first smoothing capacitor)
C2 smoothing capacitor (second smoothing capacitor)
L smoothing inductor
L1 smoothing inductor (first smoothing inductor)
L2 smoothing inductor (second smoothing inductor)
Cr resonating capacitor
Lr resonating inductor
Cc, Cc1 the clamp capacitor
T, T1, T2 transformer
N1 winding (primary winding)
N2, N23 winding (secondary winding)
N21 winding (first secondary winding)
N22 winding (second secondary winging)
S0, S31, S41 switching device (clamp switching device)
S1, S11, S12 switching device (first switching device)
S2, S21, S22 switching device (second switching device)
S3 switching device (third switching device)
S4 switching device (fourth switching device)
H1 switching device (fifth switching device)
H2 switching device (sixth switching device)
H3 switching device (seventh switching device)
H4 switching device (eighth switching device)
DH1-DH4, DS0 to DS4, DS11, DS12, DS21, DS22, DS31, DS41 diode

The invention claimed is:

1. A DC-DC converter comprising:
a first switching circuit in which a first smoothing capacitor is connected between DC terminals, and a primary winding is connected between AC terminals;
a second switching circuit in which a smoothing inductor and a second smoothing capacitor which are connected in series and connected between DC terminals, and a secondary winging is connected to AC terminals;
a transformer providing magnetic coupling between the primary winding to the secondary winding;
a voltage clamp circuit, including a clamp capacitor and a clamp switching device which are connected in series, the voltage clamp circuit being connected between the DC terminals of the second switching circuit or between the AC terminals of the second switching circuit and a first end of the second smoothing capacitor; and
a controller operating either of a first mode or a second mode, wherein, in the first mode, power inputted between first terminals, which are both terminals of the first smoothing capacitor, is outputted between second terminals, which are both terminals of the second smoothing capacitor, and, in the second mode, power inputted between the second terminals is outputted between the first terminals,
wherein, in a third mode, the controller outputs, between the first terminals and/or the second terminals, power discharged from the clamp capacitor by switching the clamp switching device, the third mode being performed between an interruption after the first mode or after the second mode and the second mode performed subsequent to the interruptions, and
wherein the second switching circuit further includes:
a first switching leg including a first switching device and a second switching device connected in series, and ends of the first switching leg are the DC terminals of the second switching circuit, and
a second switching leg connected to the first switching leg in parallel, the second switching leg including a third switching device and a fourth switching device connected in series, and a series junction between the first switching device and the second switching device and a series junction between the third switching device and the fourth switching device are the AC terminals of the second switching circuit.

2. The DC-DC converter as claimed in claim 1, wherein in the third mode, when all of the switching devices included in the second switching circuit are turned off, the controller controls the clamp switching device to turn off.

3. The DC-DC converter as claimed in claim 1,
wherein the voltage clamp circuit is connected between the DC terminals of the second switching circuit, and
wherein the second mode includes an operation of fixing the clamp switching device in an ON state and switching the first to fourth switching devices.

4. The DC-DC converter as claimed in claim 1, wherein the third mode includes an operation of switching the clamp switching device at a switching frequency lower than a switching frequency of the clamp switching device in the first mode and the second mode.

5. The DC-DC converter as claimed in claim 1,
wherein the first switching circuit includes:
a third switching leg including a fifth switching device and a sixth switching device connected in series, and
a fourth switching leg connected to the third switching leg in parallel, the fourth switching leg including a seventh switching device and an eighth switching device connected in series,
wherein both ends of the third switching leg are the DC terminals of the first switching circuit, and
a series junction of the fifth switching device and the sixth switching device and the series junction between the seventh switching device and the eighth switching device are the AC terminals of the first switching circuit.

6. The DC-DC converter as claimed in claim 1,
wherein power is transmitted and received between the first DC power source connected to the first terminals and a second DC power source connected to the second terminals.

7. The DC-DC converter as claimed in claim 1, further comprising:
a resonating capacitor and/or a resonating inductor connected to the primary winding and/or secondary winding.

8. The DC-DC converter as claimed in claim 1, further comprising:
a plurality of diodes connected to respective switching devices in anti-parallel connection, respectively.

9. A secondary battery charge and discharge system comprising:
the DC-DC converter as claimed in claim 1.

10. A DC-DC converter comprising:
a first switching circuit in which a first smoothing capacitor is connected between DC terminals, and a primary winding is connected between AC terminals;
a second switching circuit in which a smoothing inductor and a second smoothing capacitor which are connected in series and connected between DC terminals, and a secondary winging is connected to AC terminals;
a transformer providing magnetic coupling between the primary winding to the secondary winding;
a voltage clamp circuit, including a clamp capacitor and a clamp switching device which are connected in series, the voltage clamp circuit being connected between the DC terminals of the second switching circuit or between the AC terminals of the second switching circuit and a first end of the second smoothing capacitor; and a controller operating either of a first mode or a second mode, wherein in the first mode, a power inputted between the first terminals, which are both terminals of the first smoothing capacitor, is outputted between the second terminals, which are both terminals of the second smoothing capacitor, and in the second mode a power inputted between the second terminals is outputted between the first terminals, wherein, in a third mode, the controller outputs, between the first terminals and/or the second terminals, a power discharged from the clamp capacitor by switching the clamp switching device, the third mode being performed between an interruption after the first mode or after the second mode and the second mode performed subsequent to the interruptions, wherein the secondary winding includes a first secondary winding, a second secondary winding, and a connecting member connecting a first end of the first secondary winding to a first end of the second secondary winding, wherein the second switching circuit includes a first switching device and a second switching device, wherein a second end of the first secondary winding is connected to a first end of the first switching device of the second switching circuit, wherein a second end of the second secondary winding is connected to a first end of the second switching device, wherein a second end of the first switching device is connected to a second end of the second switching device, wherein a junction between the first switching device and the second switching device and a junction between the first secondary winding and the second secondary winding are the DC terminals of the second switching circuit, and wherein the first end of the first switching device and the first end of the second switching device are the AC terminals of the second switching circuit.

11. The DC-DC converter as claimed in claim 10,
wherein the first switching circuit includes:
a third switching leg including a fifth switching device and a sixth switching device connected in series, and
a fourth switching leg connected to the third switching leg in parallel, the fourth switching leg including a seventh switching device and an eighth switching device connected in series,
wherein both ends of the third switching leg are the DC terminals of the first switching circuit, and
a series junction of the fifth switching device and the sixth switching device and the series junction between the seventh switching device and the eighth switching device are the AC terminals of the first switching circuit.

12. The DC-DC converter as claimed in claim 10,
wherein power is transmitted and received between the first DC power source connected to the first terminals and a second DC power source connected to the second terminals.

13. The DC-DC converter as claimed in claim 10, further comprising:
a resonating capacitor and/or a resonating inductor connected to the primary winding and/or secondary winding; and
a plurality of diodes connected to respective switching devices in anti-parallel connection, respectively.

14. The DC-DC converter as claimed in claim 10,
wherein the first switching circuit includes:
a third switching leg including a fifth switching device and a sixth switching device connected in series, and
a fourth switching leg connected to the third switching leg in parallel, the fourth switching leg including a seventh switching device and an eighth switching device connected in series,
wherein both ends of the third switching leg are the DC terminals of the first switching circuit, and
a series junction of the fifth switching device and the sixth switching device and the series junction between the seventh switching device and the eighth switching device are the AC terminals of the first switching circuit.

15. The DC-DC converter as claimed in claim 10,
wherein power is transmitted and received between the first DC power source connected to the first terminals and a second DC power source connected to the second terminals.

16. The DC-DC converter as claimed in claim 10, further comprising:
a resonating capacitor and/or a resonating inductor connected to the primary winding and/or secondary winding; and
a plurality of diodes connected to respective switching devices in anti-parallel connection, respectively.

17. A DC-DC converter comprising:
a first switching circuit in which a first smoothing capacitor is connected between DC terminals, and a primary winding is connected between AC terminals;
a second switching circuit in which a smoothing inductor and a second smoothing capacitor which are connected in series and connected between DC terminals, and a secondary winging is connected to AC terminals;
a transformer providing magnetic coupling between the primary winding to the secondary winding;
a voltage clamp circuit, including a clamp capacitor and a clamp switching device which are connected in series, the voltage clamp circuit being connected between the DC terminals of the second switching circuit or between the AC terminals of the second switching circuit and a first end of the second smoothing capacitor; and
a controller operating either of a first mode or a second mode, wherein, in the first mode, power inputted between first terminals, which are both terminals of the first smoothing capacitor, is outputted between second terminals, which are both terminals of the second smoothing capacitor, and, in the second mode, power inputted between the second terminals is outputted between the first terminals,
wherein, in a third mode, the controller outputs, between the first terminals and/or the second terminals, power discharged from the clamp capacitor by switching the clamp switching device, the third mode being performed between an interruption after the first mode or after the second mode and the second mode performed subsequent to the interruptions,
wherein the smoothing inductor includes a first smoothing inductor, a second smoothing inductor, and a connecting member connecting a first end of the first smoothing inductor to a first end of the second smoothing inductor,
wherein the second switching circuit includes a first switching device and a second switching device, wherein the second switching circuit includes a connecting member connecting a first end of the first switching device and a first end of the second switching device, wherein a second end of the first switching device is connected to a second end of the first smoothing inductor, wherein a second end of the second switching device is connected to a second end of the second smoothing inductor, wherein the second smoothing capacitor is connected between a junction between the first smoothing inductor and the second smoothing inductor and a junction between the first switching device and the second switching device, wherein both the first end and the second end of the first switching device and both the first end and the second end of the second switching device are the DC terminals of the second switching circuit, and wherein the second end of the first switching device and the second end of the second switching device are the AC terminals of the second switching circuit.

* * * * *